United States Patent
Kijima et al.

(10) Patent No.: US 7,916,362 B2
(45) Date of Patent: *Mar. 29, 2011

(54) IMAGE SENSOR WITH IMPROVED LIGHT SENSITIVITY

(75) Inventors: Takayuki Kijima, Akiruno (JP); Hideo Nakamura, Suwa (JP); John T. Compton, LeRoy, NY (US); John F. Hamilton, Jr., Rochester, NY (US); Thomas E. DeWeese, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 1163 days.

This patent is subject to a terminal disclaimer.

(21) Appl. No.: 11/419,574

(22) Filed: May 22, 2006

(65) Prior Publication Data

US 2007/0268533 A1 Nov. 22, 2007

(51) Int. Cl.
*H04N 1/42* (2006.01)
*H04N 5/228* (2006.01)
*H04N 3/14* (2006.01)
*G06K 9/00* (2006.01)

(52) U.S. Cl. ........ 358/500; 358/512; 358/513; 358/514; 358/515; 348/222.1; 348/280; 348/298; 382/164; 382/166; 382/167

(58) Field of Classification Search .................. 358/500, 358/515, 514; 348/234, 265, 678
See application file for complete search history.

(56) References Cited

U.S. PATENT DOCUMENTS

| 4,390,895 A | 6/1983 | Sato et al. |
| 4,823,186 A | 4/1989 | Muramatsu |
| 5,323,233 A * | 6/1994 | Yamagami et al. ........... 348/277 |
| 6,441,852 B1 * | 8/2002 | Levine et al. ................. 348/302 |
| 6,476,865 B1 | 11/2002 | Gindele et al. |
| 6,642,962 B1 | 11/2003 | Lin et al. |
| 2003/0210332 A1 | 11/2003 | Frame |
| 2004/0032516 A1 * | 2/2004 | Kakarala ........................ 348/246 |
| 2005/0248667 A1 * | 11/2005 | Schweng et al. .............. 348/234 |

FOREIGN PATENT DOCUMENTS

| EP | 1 594 321 | 11/2005 |
| WO | 2007/089416 | 8/2007 |

* cited by examiner

*Primary Examiner* — Mark K Zimmerman
*Assistant Examiner* — Haris Sabah
(74) *Attorney, Agent, or Firm* — Raymond L. Owens

(57) ABSTRACT

An image sensor for capturing a color image is disclosed having a two-dimensional array having first and second groups of pixels wherein pixels from the first group of pixels have narrower spectral photoresponses than pixels from the second group of pixels and wherein the first group of pixels has individual pixels that have spectral photoresponses that correspond to a set of at least two colors, with the placement of the first and second groups of pixels defining a pattern that has a minimal repeating unit including at least six pixels with at least some rows or columns of the minimal repeating unit composed only of pixels from the second group of pixels, and including ways to combine similarly positioned pixels from at least two adjacent minimal repeating units.

25 Claims, 15 Drawing Sheets

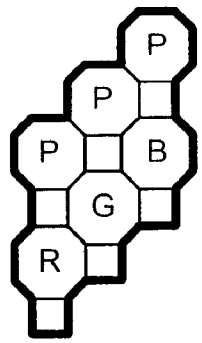
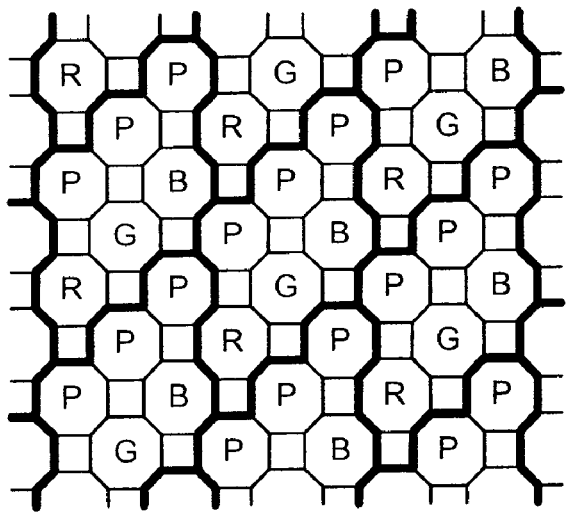
FIG. 12A  FIG. 12B
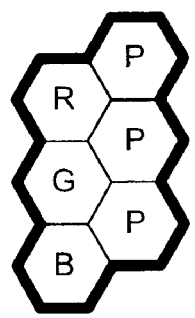
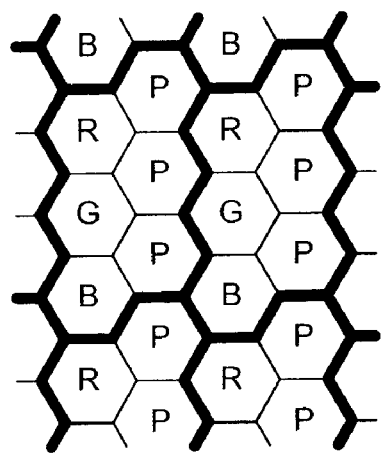
FIG. 13A  FIG. 13B
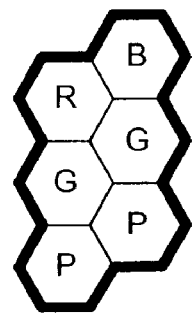
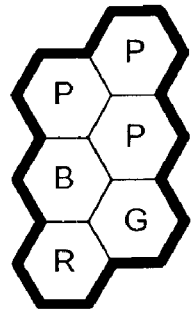
FIG. 14  FIG. 15

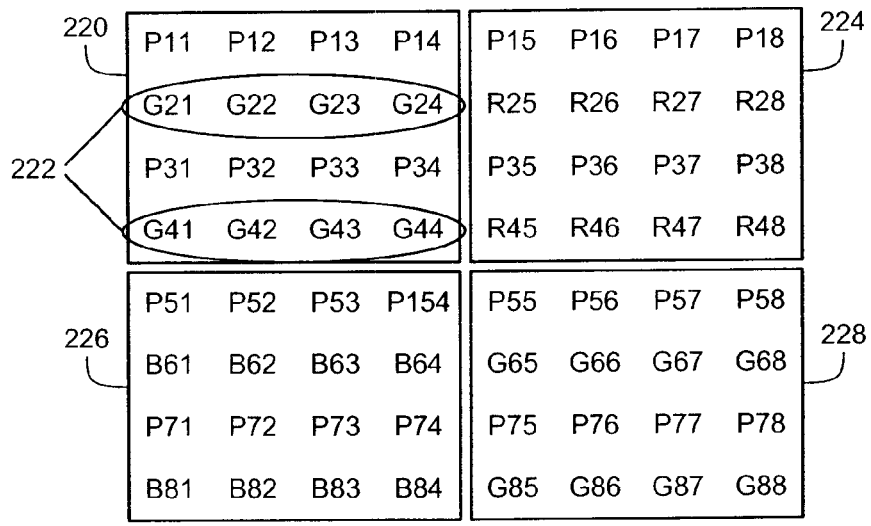
FIG. 16
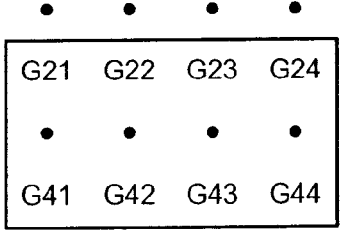
FIG. 17A  FIG. 17B
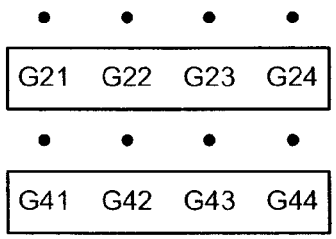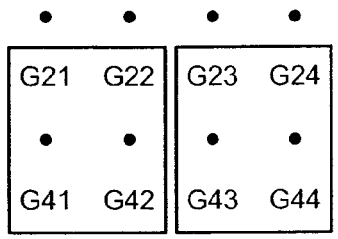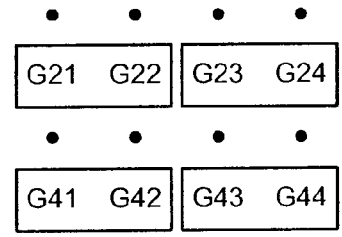
FIG. 17C  FIG. 17D  FIG. 17E

IMAGE SENSOR WITH IMPROVED LIGHT SENSITIVITY

CROSS REFERENCE TO RELATED APPLICATIONS

The present application is related to U.S. Ser. No. 11/191,538, filed Jul. 28, 2005, of John F. Hamilton Jr. and John T. Compton, entitled "PROCESSING COLOR AND PANCHROMATIC PIXELS";

U.S. Ser. No. 11/191,729, filed Jul. 28, 2005, of John T. Compton and John F. Hamilton, Jr., entitled "IMAGE SENSOR WITH IMPROVED LIGHT SENSITIVITY";

U.S. Ser. No. 11/210,234, filed Aug. 23, 2005, of John T. Compton and John F. Hamilton, Jr., entitled "CAPTURING IMAGES UNDER VARYING LIGHTING CONDITIONS";

U.S. Ser. No. 11/341,206, filed Jan. 27, 2006 of James E. Adams, Jr., et al., entitled "INTERPOLATION OF PANCHROMATIC AND COLOR PIXELS"; and U.S. Ser. No. 11/341,210, filed Jan. 27, 2006 of Takayuki Kijima, et al., entitled "IMAGE SENSOR WITH IMPROVED LIGHT SENSITIVITY".

FIELD OF THE INVENTION

This invention relates to a two-dimensional image sensor with improved light sensitivity.

BACKGROUND OF THE INVENTION

An electronic imaging system depends on an electronic image sensor to create an electronic representation of a visual image. Examples of such electronic image sensors include charge coupled device (CCD) image sensors and active pixel sensor (APS) devices (APS devices are often referred to as CMOS sensors because of the ability to fabricate them in a Complementary Metal Oxide Semiconductor process). Typically, these images sensors include a number of light sensitive pixels, often arranged in a regular pattern of rows and columns. For capturing color images, a pattern of filters is typically fabricated on the pattern of pixels, with different filter materials being used to make individual pixels sensitive to only a portion of the visible light spectrum. The color filters necessarily reduce the amount of light reaching each pixel, and thereby reduce the light sensitivity of each pixel. A need persists for improving the light sensitivity, or photographic speed, of electronic color image sensors to permit images to be captured at lower light levels or to allow images at higher light levels to be captured with shorter exposure times.

Image sensors are either linear or two-dimensional. Generally, these sensors have two different types of applications. The two-dimensional sensors are typically suitable for image capture devices such as digital cameras, cell phones and other applications. Linear sensors are often used for scanning documents. In either case, when color filters are employed the image sensors have reduced sensitivity.

A linear image sensor, the KLI-4104 manufactured by Eastman Kodak Company, includes four linear, single pixel wide arrays of pixels, with color filters applied to three of the arrays to make each array sensitive to either red, green, or blue in its entirety, and with no color filter array applied to the fourth array; furthermore, the three color arrays have larger pixels to compensate for the reduction in light sensitivity due to the color filters, and the fourth array has smaller pixels to capture a high resolution monochrome image. When an image is captured using this image sensor, the image is represented as a high resolution, high photographic sensitivity monochrome image along with three lower resolution images with roughly the same photographic sensitivity and with each of the three images corresponding to either red, green, or blue light from the image; hence, each point in the electronic image includes a monochrome value, a red value, a green value, and a blue value. However, since this is a linear image sensor, it requires relative mechanical motion between the image sensor and the image in order to scan the image across the four linear arrays of pixels. This limits the speed with which the image is scanned and precludes the use of this sensor in a handheld camera or in capturing a scene that includes moving objects.

There is also known in the art an electronic imaging system described in U.S. Pat. No. 4,823,186 by Akira Muramatsu that includes two sensors, wherein each of the sensors includes a two-dimensional array of pixels but one sensor has no color filters and the other sensor includes a pattern of color filters included with the pixels, and with an optical beam splitter to provide each image sensor with the image. Since the color sensor has a pattern of color filters applied, each pixel in the color sensor provides only a single color. When an image is captured with this system, each point in the electronic image includes a monochrome value and one color value, and the color image must have the missing colors at each pixel location interpolated from the nearby colors. Although this system improves the light sensitivity over a single conventional image sensor, the overall complexity, size, and cost of the system is greater due to the need for two sensors and a beam splitter. Furthermore, the beam splitter directs only half the light from the image to each sensor, limiting the improvement in photographic speed.

In addition to the linear image sensor mentioned above, there are known in the art image sensors with two-dimensional arrays of pixels where the pixels include pixels that do not have color filters applied to them. For example, see Sato, et al. in U.S. Pat. No. 4,390,895, Yamagami, et al. in U.S. Pat. No. 5,323,233, and Gindele, et al. in U.S. Pat. No. 6,476,865. In each of the cited patents, the sensitivity of the unfiltered or monochrome pixels is significantly higher than the color pixels, requiring the application of gain to the color pixels in order to match the color and monochrome signals from the pixel array. Increasing gain increases noise as well as signal, causing degradation in the overall signal to noise ratio of the resulting image. Frame in US Patent Application 2003/0210332 discloses a pixel array with most of the pixels being unfiltered, but the color pixels suffer from the same sensitivity deficit as mentioned above.

Therefore, there persists a need for improving the light sensitivity for electronic capture devices that employ a single sensor with a two-dimensional array of pixels.

SUMMARY OF THE INVENTION

The present invention is directed to providing an image sensor having a two-dimensional array of color and panchromatic pixels that provides high sensitivity and is effective in producing full color images.

Briefly summarized, according to one aspect of the present invention, the invention provides an image sensor for capturing a color image, comprising:

a) a two-dimensional array having first and second groups of pixels, arranged in rows and columns, wherein pixels from the first group of pixels have narrower spectral photoresponses than pixels from the second group of pixels and wherein the first group of pixels has pixels that have spectral photoresponses that correspond to a set of at least two colors;

b) the placement of the first and second groups of pixels defining a pattern that has a minimal repeating unit including at least six pixels, so that at least some rows or columns of the minimal repeating unit are composed only of pixels from the second group, and c) means for combining similarly positioned pixels from at least two adjacent minimal repeating units, means for combining pixels of like color from at least three adjacent minimal repeating units, or means for combining first group pixels with second group pixels.

In another aspect of the invention, an image sensor is provided for capturing a color image, comprising:

a) a two-dimensional array having first and second groups of pixels wherein pixels from the first group of pixels have narrower spectral photoresponses than pixels from the second group of pixels and wherein the first group of pixels has individual pixels that have spectral photoresponses that correspond to a set of at least two colors;

b) the placement of the first and second groups of pixels defining a pattern that has a minimal repeating unit including at least twelve pixels, the minimal repeating unit having a plurality of cells wherein each cell has at least two pixels representing a specific color selected from the first group of pixels and a plurality of pixels selected from the second group of pixels arranged to permit the reproduction of a captured color image under different lighting conditions; and c) means for combining at least two of the at least two pixels, means for combining pixels of like color from at least two of the plurality of cells within the minimal repeating unit, or means for combining first group pixels with second group pixels.

Image sensors in accordance with the present invention are particularly suitable for low level lighting conditions, where such low level lighting conditions are the result of low scene lighting, short exposure time, small aperture, or other restriction on light reaching the sensor. They have a broad application and numerous types of image capture devices can effectively use these sensors.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 6A is the interpolated panchromatic image for FIG. 4A;

FIG. 6B is the low-resolution color image corresponding to the cells in FIG. 4A and FIG. 5;

FIGS. 7A-C shows several ways of combining the pixels of FIG. 4A;

FIGS. 8A-E provides a minimal repeating unit of six pixels for a color filter array pattern of the present invention including several tiling arrangements and an alternative orientation for the minimal repeating unit;

FIG. 9A-C provides several minimal repeating units for color filter array patterns of the present invention that are variants of the minimal repeating unit of FIG. 8;

FIGS. 10A-F provides a minimal repeating unit of eight pixels for a color filter array pattern of the present invention and includes a tiling arrangement and variations with color pixels that have alternative color photoresponse characteristics, including primary color, complementary color, three color, and four color alternatives;

FIGS. 11A-B provides a minimal repeating unit for a color filter array of the present invention in which more than half the pixels have a panchromatic photoresponse;

FIGS. 12A-B provides a minimal repeating unit and for a color filter array of the present invention in which the pixels are on a rectangular grid that is rotated forty-five degrees, and includes a tiling arrangement;

FIGS. 13A-B provides a minimal repeating unit and for a color filter array of the present invention in which the pixels are arranged in a hexagonal pattern, and includes a tiling arrangement;

FIG. 14 provides a minimal repeating unit for a color filter array of the present invention that is an alternative to FIG. 13;

FIG. 15 provides a minimal repeating unit for a color filter array of the present invention that is an alternative to FIG. 13;

FIG. 16 is the minimal repeating unit of FIG. 4A with subscripts for individual pixels within the minimal repeating unit;

FIGS. 17A-E shows the panchromatic pixels and the color pixels of one cell of FIG. 16, and various ways in which the color pixels are combined;

DETAILED DESCRIPTION OF THE INVENTION

Because digital cameras employing imaging devices and related circuitry for signal capture and correction and for exposure control are well known, the present description will be directed in particular to elements forming part of, or cooperating more directly with, method and apparatus in accordance with the present invention. Elements not specifically shown or described herein are selected from those known in the art. Certain aspects of the embodiments to be described are provided in software. Given the system as shown and described according to the invention in the following materials, software not specifically shown, described or suggested herein that is useful for implementation of the invention is conventional and within the ordinary skill in such arts.

Figure 1:
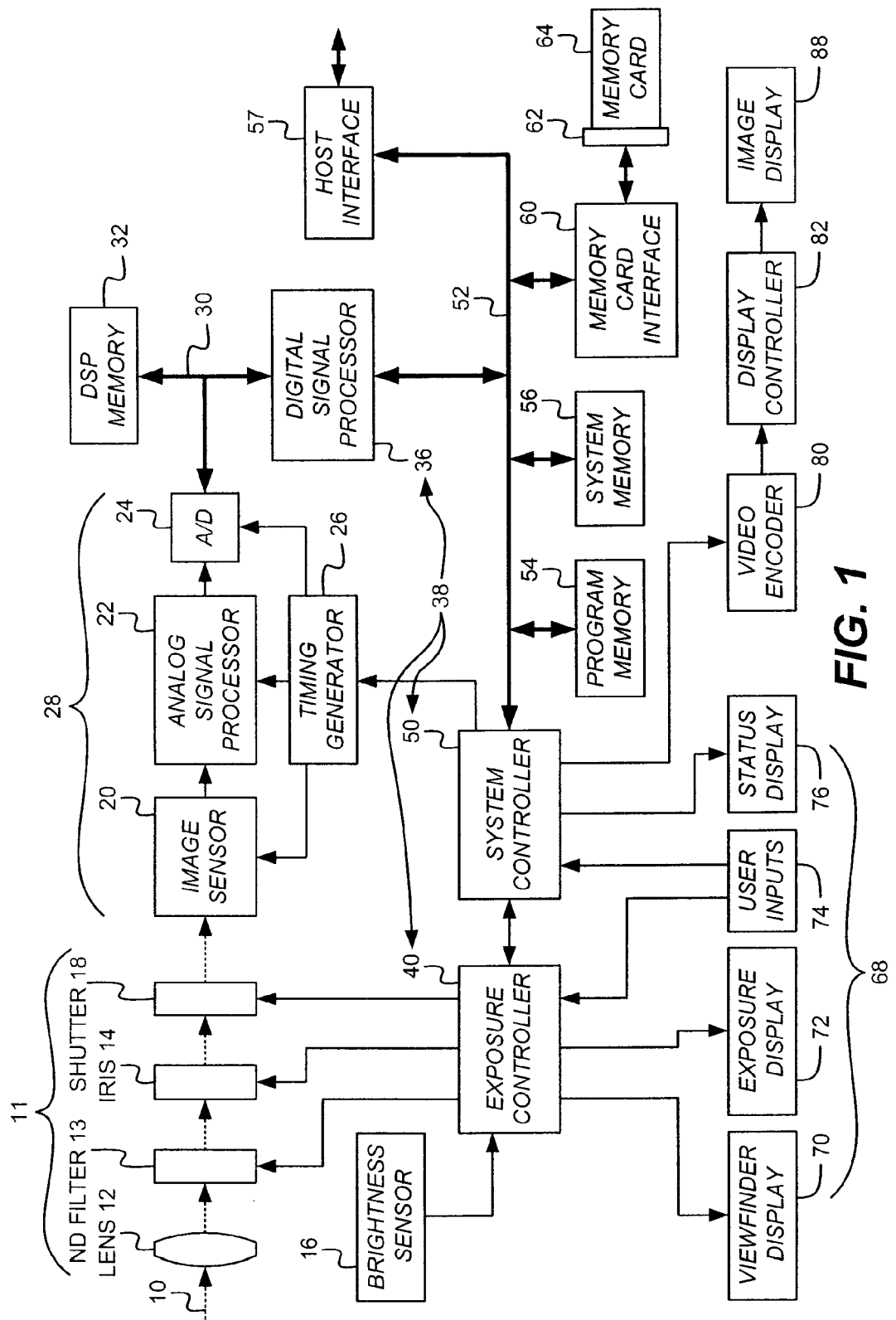
FIG. 1 is a block diagram of a conventional digital still camera system that can employ a conventional sensor and processing methods or the sensor and processing methods of the current invention.

Turning now to FIG. 1, a block diagram of an image capture device shown as a digital camera embodying the present invention is shown. Although a digital camera will now be explained, the present invention is clearly applicable to other types of image capture devices. In the disclosed camera, light 10 from the subject scene is input to an imaging stage 11, where the light is focused by lens 12 to form an image on solid state image sensor 20. Image sensor 20 converts the incident light to an electrical signal for each picture element (pixel). The image sensor 20 of the preferred embodiment is a charge coupled device (CCD) type or an active pixel sensor (APS) type (APS devices are often referred to as CMOS sensors because of the ability to fabricate them in a Complementary Metal Oxide Semiconductor process). Other types of image sensors having two-dimensional array of pixels are used provided that they employ the present invention. The present invention also makes use of an image sensor 20 having a two-dimensional array of color and panchromatic pixels as will become clear later in this specification after FIG. 1 is described. Examples of the patterns of color and panchromatic pixels of the present invention that are used with the image sensor 20 are seen in FIGS. 4A-D, FIG. 8A, FIG. 8E, FIGS. 9A-C, FIG. 10A, FIGS. 10C-F, FIGS. 11A-B, FIG. 12, FIG. 13, FIG. 14, and FIG. 15, although other patterns are used within the spirit of the present invention.

The amount of light reaching the sensor 20 is regulated by an iris block 14 that varies the aperture and the neutral density (ND) filter block 13 that includes one or more ND filters interposed in the optical path. Also regulating the overall light level is the time that the shutter block 18 is open. The exposure controller block 40 responds to the amount of light available in the scene as metered by the brightness sensor block 16 and controls all three of these regulating functions.

This description of a particular camera configuration will be familiar to one skilled in the art, and it will be obvious that many variations and additional features are present. For example, an autofocus system is added, or the lenses are detachable and interchangeable. It will be understood that the present invention is applied to any type of digital camera, where similar functionality is provided by alternative components. For example, the digital camera is a relatively simple point and shoot digital camera, where the shutter 18 is a relatively simple movable blade shutter, or the like, instead of the more complicated focal plane arrangement. The present invention can also be practiced on imaging components included in non-camera devices such as mobile phones and automotive vehicles.

The analog signal from image sensor 20 is processed by analog signal processor 22 and applied to analog to digital (A/D) converter 24. Timing generator 26 produces various clocking signals to select rows and pixels and synchronizes the operation of analog signal processor 22 and A/D converter 24. The image sensor stage 28 includes the image sensor 20, the analog signal processor 22, the A/D converter 24, and the timing generator 26. The components of image sensor stage 28 are separately fabricated integrated circuits, or they are fabricated as a single integrated circuit as is commonly done with CMOS image sensors. The resulting stream of digital pixel values from A/D converter 24 is stored in memory 32 associated with digital signal processor (DSP) 36.

Digital signal processor 36 is one of three processors or controllers in this embodiment, in addition to system controller 50 and exposure controller 40. Although this partitioning of camera functional control among multiple controllers and processors is typical, these controllers or processors are combined in various ways without affecting the functional operation of the camera and the application of the present invention. These controllers or processors can comprise one or more digital signal processor devices, microcontrollers, programmable logic devices, or other digital logic circuits. Although a combination of such controllers or processors has been described, it should be apparent that an alternative embodiment designates one controller or processor to perform all of the needed functions. All of these variations can perform the same function and fall within the scope of this invention, and the term "processing stage" will be used as needed to encompass all of this functionality within one phrase, for example, as in processing stage 38 in FIG. 1.

In the illustrated embodiment, DSP 36 manipulates the digital image data in its memory 32 according to a software program permanently stored in program memory 54 and copied to memory 32 for execution during image capture. DSP 36 executes the software necessary for practicing image processing shown in FIG. 18. Memory 32 includes any type of memory, such as SDRAM. A bus 30 comprising a pathway for address and data signals connects DSP 36 to its related memory 32, A/D converter 24 and other related devices.

System controller 50 controls the overall operation of the camera based on a software program stored in program memory 54, which can include Flash EEPROM or other nonvolatile memory. This memory is also used to store image sensor calibration data, user setting selections and other data which must be preserved when the camera is turned off. System controller 50 controls the sequence of image capture by directing exposure controller 40 to operate the lens 12, ND filter 13, iris 14, and shutter 18 as previously described, directing the timing generator 26 to operate the image sensor 20 and associated elements, and directing DSP 36 to process the captured image data. After an image is captured and processed, the final image file stored in memory 32 is transferred to a host computer via interface 57, stored on a removable memory card 64 or other storage device, and displayed for the user on image display 88.

A bus 52 includes a pathway for address, data and control signals, and connects system controller 50 to DSP 36, program memory 54, system memory 56, host interface 57, memory card interface 60 and other related devices. Host interface 57 provides a high speed connection to a personal computer (PC) or other host computer for transfer of image data for display, storage, manipulation or printing. This interface is an IEEE1394 or USB2.0 interface or any other suitable digital interface. Memory card 64 is typically a Compact Flash (CF) card inserted into socket 62 and connected to the system controller 50 via memory card interface 60. Other types of storage that are utilized include without limitation PC-Cards, MultiMedia Cards (MMC), or Secure Digital (SD) cards.

Processed images are copied to a display buffer in system memory 56 and continuously read out via video encoder 80 to produce a video signal. This signal is output directly from the camera for display on an external monitor, or processed by display controller 82 and presented on image display 88. This display is typically an active matrix color liquid crystal display (LCD), although other types of displays are used as well.

A user control and interface status 68, including all or any combination of viewfinder display 70, exposure display 72, status display 76, image display 88, and user inputs 74, is controlled by a combination of software programs executed on exposure controller 40 and system controller 50. User inputs 74 typically include some combination of buttons, rocker switches, joysticks, rotary dials or touchscreens. Exposure controller 40 operates light metering, exposure mode, autofocus and other exposure functions. The system controller 50 manages the graphical user interface (GUI) presented on one or more of the displays, e.g., on image display 88. The GUI typically includes menus for making various option selections and review modes for examining captured images.

Exposure controller 40 accepts user inputs selecting exposure mode, lens aperture, exposure time (shutter speed), and exposure index or ISO speed rating and directs the lens and shutter accordingly for subsequent captures. Brightness sensor 16 is employed to measure the brightness of the scene and provide an exposure meter function for the user to refer to when manually setting the ISO speed rating, aperture and shutter speed. In this case, as the user changes one or more settings, the light meter indicator presented on viewfinder display 70 tells the user to what degree the image will be over or underexposed. In an automatic exposure mode, the user changes one setting and the exposure controller 40 automatically alters another setting to maintain correct exposure, e.g., for a given ISO speed rating when the user reduces the lens aperture the exposure controller 40 automatically increases the exposure time to maintain the same overall exposure.

The ISO speed rating is an important attribute of a digital still camera. The exposure time, the lens aperture, the lens transmittance, the level and spectral distribution of the scene illumination, and the scene reflectance determine the exposure level of a digital still camera. When an image from a digital still camera is obtained using an insufficient exposure, proper tone reproduction can generally be maintained by increasing the electronic or digital gain, but the image will contain an unacceptable amount of noise. As the exposure is increased, the gain is decreased, and therefore the image noise can normally be reduced to an acceptable level. If the exposure is increased excessively, the resulting signal in bright areas of the image can exceed the maximum signal level capacity of the image sensor or camera signal processing. This can cause image highlights to be clipped to form a uniformly bright area, or to bloom into surrounding areas of the image. It is important to guide the user in setting proper exposures. An ISO speed rating is intended to serve as such a guide. In order to be easily understood by photographers, the ISO speed rating for a digital still camera should directly relate to the ISO speed rating for photographic film cameras. For example, if a digital still camera has an ISO speed rating of ISO 200, then the same exposure time and aperture should be appropriate for an ISO 200 rated film/process system.

The ISO speed ratings are intended to harmonize with film ISO speed ratings. However, there are differences between electronic and film-based imaging systems that preclude exact equivalency. Digital still cameras can include variable gain, and can provide digital processing after the image data has been captured, enabling tone reproduction to be achieved over a range of camera exposures. It is therefore possible for digital still cameras to have a range of speed ratings. This range is defined as the ISO speed latitude. To prevent confusion, a single value is designated as the inherent ISO speed rating, with the ISO speed latitude upper and lower limits indicating the speed range, that is, a range including effective speed ratings that differ from the inherent ISO speed rating. With this in mind, the inherent ISO speed is a numerical value calculated from the exposure provided at the focal plane of a digital still camera to produce specified camera output signal characteristics. The inherent speed is usually the exposure index value that produces peak image quality for a given camera system for normal scenes, where the exposure index is a numerical value that is inversely proportional to the exposure provided to the image sensor.

The foregoing description of a digital camera will be familiar to one skilled in the art. It will be obvious that there are many variations of this embodiment that are possible and are selected to reduce the cost, add features or improve the performance of the camera. The following description will disclose in detail the operation of this camera for capturing images according to the present invention. Although this description is with reference to a digital camera, it will be understood that the present invention applies for use with any type of image capture device having an image sensor with color and panchromatic pixels.

The image sensor 20 shown in FIG. 1 typically includes a two-dimensional array of light sensitive pixels fabricated on a silicon substrate that provide a way of converting incoming light at each pixel into an electrical signal that is measured. As the sensor is exposed to light, free electrons are generated and captured within the electronic structure at each pixel. Capturing these free electrons for some period of time and then measuring the number of electrons captured, or measuring the rate at which free electrons are generated, allows the light level at each pixel to be measured. In the former case, accumulated charge is shifted out of the array of pixels to a charge to voltage measurement circuit as in a charge coupled device (CCD), or the area close to each pixel contains elements of a charge to voltage measurement circuit as in an active pixel sensor (APS or CMOS sensor).

Whenever general reference is made to an image sensor in the following description, it is understood to be representative of the image sensor 20 from FIG. 1. It is further understood that all examples and their equivalents of image sensor architectures and pixel patterns of the present invention disclosed in this specification are used for image sensor 20.

In the context of an image sensor, a pixel (a contraction of "picture element") refers to a discrete light sensing area and charge shifting or charge measurement circuitry associated with the light sensing area. In the context of a digital color image, the term pixel commonly refers to a particular location in the image having associated color values.

Figures 2, 3:
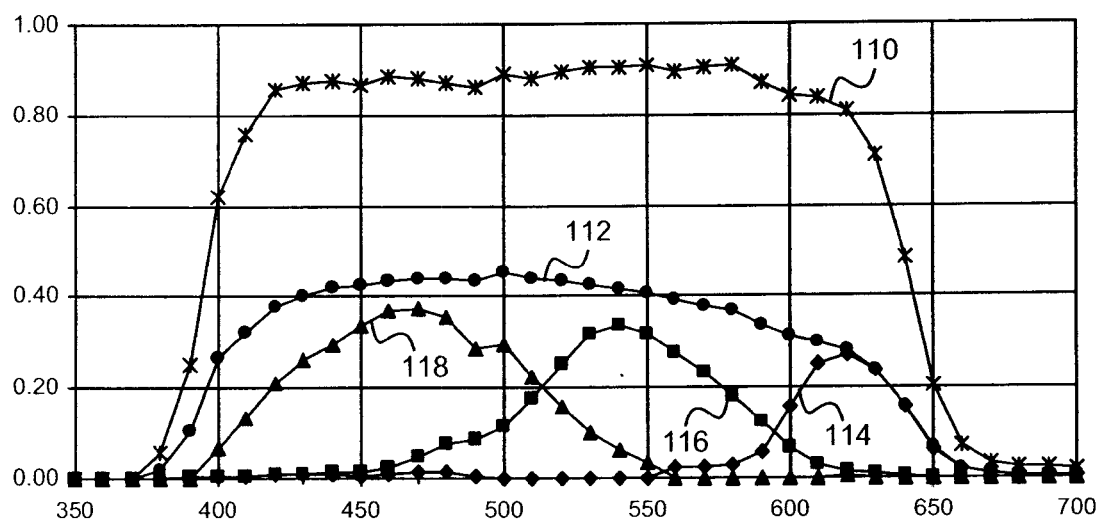
FIG. 2 (prior art) is a conventional Bayer color filter array pattern showing a minimal repeating unit and a non-minimal repeating unit.
FIG. 3 provides representative spectral quantum efficiency curves for red, green, and blue pixels, as well as a wider spectrum panchromatic quantum efficiency, all multiplied by the transmission characteristics of an infrared cut filter.

In order to produce a color image, the array of pixels in an image sensor typically has a pattern of color filters placed over them. FIG. 2 shows a pattern of red, green, and blue color filters that is commonly used. This particular pattern is commonly known as a Bayer color filter array (CFA) after its inventor Bryce Bayer as disclosed in U.S. Pat. No. 3,971,065. This pattern is effectively used in image sensors having a two-dimensional array of color pixels. As a result, each pixel has a particular color photoresponse that, in this case, is a predominant sensitivity to red, green or blue light. Another useful variety of color photoresponses is a predominant sensitivity to magenta, yellow, or cyan light. In each case, the particular color photoresponse has high sensitivity to certain portions of the visible spectrum, while simultaneously having low sensitivity to other portions of the visible spectrum. The term color pixel will refer to a pixel having a color photoresponse.

The set of color photoresponses selected for use in a sensor usually has three colors, as shown in the Bayer CFA, but it can also include four or more. As used herein, a panchromatic photoresponse refers to a photoresponse having a wider spectral sensitivity than those spectral sensitivities represented in the selected set of color photoresponses. A panchromatic photosensitivity can have high sensitivity across the entire visible spectrum. The term panchromatic pixel will refer to a pixel having a panchromatic photoresponse. Although the panchromatic pixels generally have a wider spectral sensitivity than the set of color photoresponses, each panchromatic pixel can have an associated filter. Such filter is either a neutral density filter or a color filter.

When a pattern of color and panchromatic pixels is on the face of an image sensor, each such pattern has a repeating unit that is a contiguous subarray of pixels that acts as a basic building block. By juxtaposing multiple copies of the repeating unit, the entire sensor pattern is produced. The juxtaposition of the multiple copies of repeating units is done in diagonal directions as well as in the horizontal and vertical directions.

A minimal repeating unit is a repeating unit such that no other repeating unit has fewer pixels. For example, the CFA in FIG. 2 includes a minimal repeating unit that is two pixels by two pixels as shown by pixel block 100 in FIG. 2. Multiple copies of this minimal repeating unit are tiled to cover the entire array of pixels in an image sensor. The minimal repeating unit is shown with a green pixel in the upper right corner, but three alternative minimal repeating units can easily be discerned by moving the heavy outlined area one pixel to the right, one pixel down, or one pixel diagonally to the right and down. Although pixel block 102 is a repeating unit, it is not a minimal repeating unit because pixel block 100 is a repeating unit and block 100 has fewer pixels than block 102.

An image captured using an image sensor having a two-dimensional array with the CFA of FIG. 2 has only one color value at each pixel. In order to produce a full color image, there are a number of techniques for inferring or interpolating the missing colors at each pixel. These CFA interpolation techniques are well known in the art and reference is made to the following patents: U.S. Pat. No. 5,506,619, U.S. Pat. No. 5,629,734, and U.S. Pat. No. 5,652,621.

FIG. 3 shows the relative spectral sensitivities of the pixels with red, green, and blue color filters in a typical camera application. The X-axis in FIG. 3 represents light wavelength in nanometers, and the Y-axis represents efficiency. In FIG. 3, curve 110 represents the spectral transmission characteristic of a typical filter used to block infrared and ultraviolet light from reaching the image sensor. Such a filter is needed because the color filters used for image sensors typically do not block infrared light, hence the pixels are unable to distinguish between infrared light and light that is within the passbands of their associated color filters. The infrared blocking characteristic shown by curve 110 prevents infrared light from corrupting the visible light signal. The spectral quantum efficiency, i.e. the proportion of incident photons that are captured and converted into a measurable electrical signal, for a typical silicon sensor with red, green, and blue filters applied is multiplied by the spectral transmission characteristic of the infrared blocking filter represented by curve 110 to produce the combined system quantum efficiencies represented by curve 114 for red, curve 116 for green, and curve 118 for blue. It is understood from these curves that each color photoresponse is sensitive to only a portion of the visible spectrum. By contrast, the photoresponse of the same silicon sensor that does not have color filters applied (but including the infrared blocking filter characteristic) is shown by curve 112; this is an example of a panchromatic photoresponse. By comparing the color photoresponse curves 114, 116, and 118 to the panchromatic photoresponse curve 112, it is clear that the panchromatic photoresponse is three to four times more sensitive to wide spectrum light than any of the color photoresponses.

The greater panchromatic sensitivity shown in FIG. 3 permits improving the overall sensitivity of an image sensor by intermixing pixels that include color filters with pixels that do not include color filters. However, the color filter pixels will be significantly less sensitive than the panchromatic pixels. In this situation, if the panchromatic pixels are properly exposed to light such that the range of light intensities from a scene cover the full measurement range of the panchromatic pixels, then the color pixels will be significantly underexposed. Hence, it is advantageous to adjust the sensitivity of the color filter pixels so that they have roughly the same sensitivity as the panchromatic pixels. The sensitivity of the color pixels are increased, for example, by increasing the size of the color pixels relative to the panchromatic pixels, with an associated reduction in spatial pixels.

Figures 4A, 4B, 4C, 4D, 5:
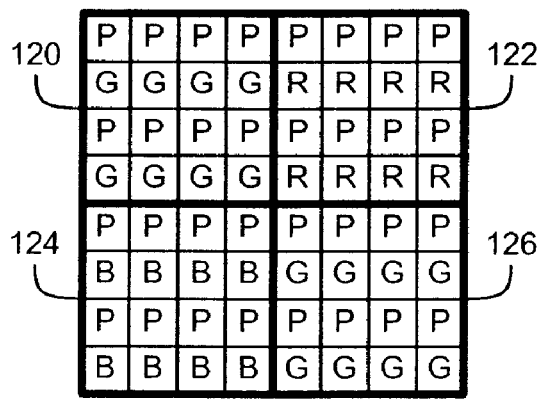
FIGS. 4A-D provides minimal repeating units for several variations of a color filter array pattern of the present invention that has color pixels with the same color photo response arranged in rows or columns.
FIG. 5 shows the cell structure of the minimal repeating unit from FIG. 4A.

FIG. 4A represents a two-dimensional array of pixels having two groups. Pixels from the first group of pixels have a narrower spectral photoresponse than pixels from the second group of pixels. The first group of pixels includes individual pixels that relate to at least two different spectral photoresponses corresponding to at least two color filters. These two groups of pixels are intermixed to improve the overall sensitivity of the sensor. As will become clearer in this specification, the placement of the first and second groups of pixels defines a pattern that has a minimal repeating unit including at least twelve pixels. The minimal repeating unit includes first and second groups of pixels arranged to permit the reproduction of a captured color image under different lighting conditions.

The complete pattern shown in FIG. 4A represents a minimal repeating unit that is tiled to cover an entire array of pixels. As with FIG. 2, there are several other minimal repeating units that are used to describe this overall arrangement of color and panchromatic pixels, but they are all essentially equivalent in their characteristics and each is a subarray of pixels, the subarray being eight pixels by eight pixels in extent. An important feature of this pattern is alternating rows of panchromatic and color pixels with the color rows having pixels with the same color photoresponse grouped together. The groups of pixels with the same photoresponse along with some of their neighboring panchromatic pixels are considered to form four cells that make up the minimal repeating unit, a cell being a contiguous subarray of pixels having fewer pixels than a minimal repeating unit.

These four cells, delineated by heavy lines in FIG. 4A and shown as cells 120, 122, 124, and 126 in FIG. 5, enclose four groups of four-by-four pixels each, with 120 representing the upper left cell, 122 representing the upper right cell, 124 representing the lower left cell, and 126 representing the lower right cell. Each of the four cells includes eight panchromatic pixels and eight color pixels of the same color photoresponse. The color pixels in a cell are combined to represent the color for that entire cell. Hence, cell 120 in FIG. 5 is considered to be a green cell, cell 122 is considered to be a red cell, and so on. Each cell includes at least two pixels of the same color, thereby allowing pixels of the same color to be combined to overcome the difference in photosensitivity between the color pixels and the panchromatic pixels.

In the case of a minimal repeating unit with four non-overlapping cells, with each cell having two pixels of the same color and two panchromatic pixels, it is clear that the minimal repeating unit includes sixteen pixels. In the case of a minimal repeating unit with three non-overlapping cells, with each cell having two pixels of the same color and two panchromatic pixels, it is clear that the minimal repeating unit includes twelve pixels.

Figures 6A, 6B, 7A, 7B, 7C:
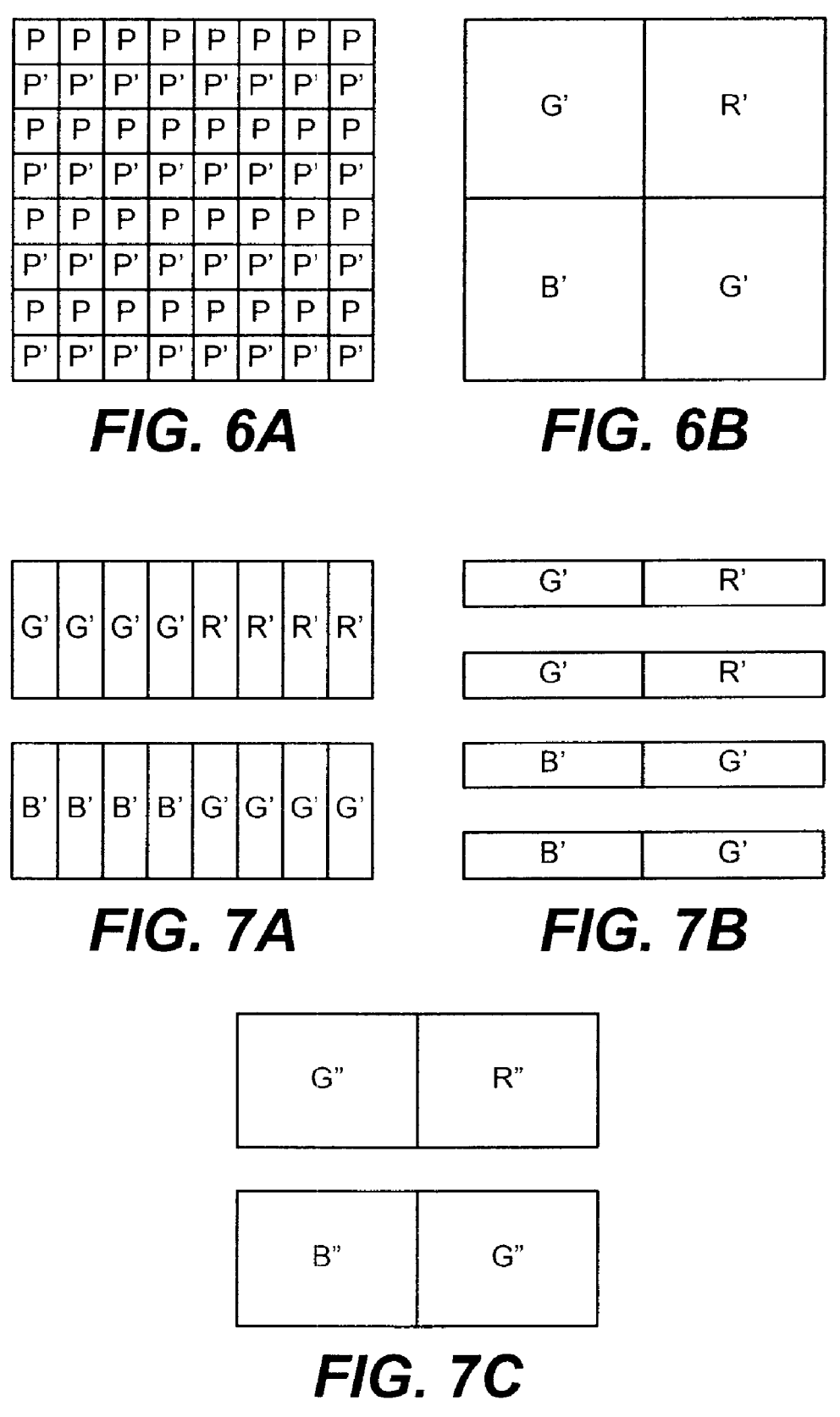

In accordance with the present invention, the minimal repeating unit of FIG. 4A, when considered in light of the cell structure identified in FIG. 5, can represent the combination of a high-resolution panchromatic image and a low-resolution Bayer pattern color image arranged to permit the reproduction of a captured color image under different lighting conditions. The individual elements of the Bayer pattern image represent the combination of the color pixels in the corresponding cells. The first group of pixels defines a low-resolution color filter array image and the second group of pixels defines a high-resolution panchromatic image. See FIG. 6A and FIG. 6B. FIG. 6A represents the high-resolution panchromatic image corresponding to FIG. 4A, including both the panchromatic pixels P from FIG. 4A as well as interpolated panchromatic pixels P'; and FIG. 6B represents the low-resolution Bayer pattern color image, with R', G', and B' representing for each of the cells outlined in FIG. 5 the cell color associated with the combined color pixels in the cell.

In the following discussion, all cells in FIGS. 4B-D are delineated by heavy lines, as they were in FIG. 4A.

In addition to alternative minimal repeating units of FIG. 4A, each cell of the pattern is rotated 90 degrees to produce the pattern shown in FIG. 4B. This is substantially the same pattern, but it places the highest panchromatic sampling frequency in the vertical direction instead of the horizontal direction. The choice to use FIG. 4A or FIG. 4B depends on whether or not it is desired to have higher panchromatic spatial sampling in either the horizontal or vertical directions respectively. However, it is clear that the resulting cells that make up the minimal repeating unit in both patterns produce the same low-resolution color image for both patterns. Hence, FIG. 4A and FIG. 4B are equivalent from a color perspective. In general, FIG. 4A and FIG. 4B are examples of practicing the present invention with the panchromatic pixels arranged linearly in either rows or columns. Furthermore, FIG. 4A has single rows of panchromatic pixels with each row separated from a neighboring row of panchromatic pixels by a row of color pixels; FIG. 4B has the same characteristic in the column direction.

FIG. 4C represents yet another alternative minimal repeating unit to FIG. 4A with essentially the same cell color characteristics. However, FIG. 4C shows the panchromatic and color rows staggered on a cell by cell basis. This can improve the vertical panchromatic resolution. Yet another alternative minimal repeating unit to FIG. 4A is represented in FIG. 4D, wherein the panchromatic and color rows are staggered by column pairs. This also has the potential of improving the vertical panchromatic resolution. A characteristic of all of the minimal repeating units of FIGS. 4A-D is that groups of two or more same color pixels are arranged side by side in either rows or columns.

FIGS. 4A-D all have the same color structure with the cells that constitute the minimal repeating unit expressing a low-resolution Bayer pattern. It can therefore be seen that a variety of arrangements of panchromatic pixels and grouped color pixels are constructed within the spirit of the present invention.

In order to increase the color photosensitivity to overcome the disparity between the panchromatic photosensitivity and the color photosensitivity, the color pixels within each cell are combined in various ways. For example, the charge from same colored pixels is combined or binned in a CCD image sensor or in types of active pixel sensors that permit binning (see FIG. 1, image sensor 20). Alternatively, the voltages corresponding to the measured amounts of charge in same colored pixels are averaged, for example by connecting in parallel capacitors that are charged to these voltages (see FIG. 1, image sensor 20). In the case of averaging voltages by connecting in parallel capacitors, the capacitors can be of equal sizes to do a simple average, or they can be of different sizes in order to do a weighted average. In yet another approach, the digital representations of the light levels at same colored pixels are summed, averaged, or digitally filtered to provide a combined result, for example in FIG. 1, digital signal processor 36. Combining or binning charge from two pixels doubles the signal level, while the noise associated with sampling and reading out the combined signal remains the same, thereby increasing the signal to noise ratio by a factor of two, representing a corresponding two times increase in the photosensitivity of the combined pixels. In the case of summing the digital representations of the light levels from two pixels, the resulting signal increases by a factor of two, but the corresponding noise levels from reading the two pixels combine in quadrature, thereby increasing the noise by the square root of two; the resulting signal to noise ratio of the combined pixels therefore increases by the square root of two over the uncombined signals. A similar analysis applies to voltage or digital averaging.

The previously mentioned approaches for combining signals from same colored pixels within a cell are used singly or in combinations. For example, vertically combining the charge from same colored pixels in FIG. 4A in groups of two produces the combined pixels with combined signals R', G', and B' shown in FIG. 7A. In this case, each R', G', and B' has twice the sensitivity of the uncombined pixels. Alternatively, horizontally combining by summing the measured values, (either voltage or digital) from same colored pixels in FIG. 4A in groups of four produces the combined pixels with combined signals R', G', and B' shown in FIG. 7B. In this case, since the signal increases by a factor of four but the noise increases by 2, each R', G', and B' has twice the sensitivity of the uncombined pixels. In another alternative combination scheme, vertically combining the charge from same colored pixels in groups of two as in FIG. 7A, and horizontally summing or averaging the measured values of the combined pixels of FIG. 7A in groups of four produces the final combined color pixels of FIG. 7C, with R", G", and B" representing the final combinations of same colored pixels. In this combination arrangement, the final combined color pixels of FIG. 7C each have four times the sensitivity of the uncombined pixels. Some sensor architectures, notably certain CCD arrangements, can permit the charge from all eight same colored pixels within each cell to be combined in the fashion of FIG. 7C, leading to an eightfold increase in sensitivity for the combined color pixels.

From the foregoing, it will now be understood that there are several degrees of freedom in combining color pixels for the purpose of adjusting the photosensitivity of the color pixels. Well known combining schemes will suggest themselves to one skilled in the art that are based on scene content, scene illuminant, overall light level, or other criteria. Furthermore, the combining scheme is selected to deliberately permit the combined pixels to have either less sensitivity or more sensitivity than the panchromatic pixels. The various ways of combining pixels discussed above are used with image sensors employing any of the patterns described in this disclosure and related disclosures.

Figures 8A, 8B, 8C, 8D, 8E, 9A, 9B, 9C:
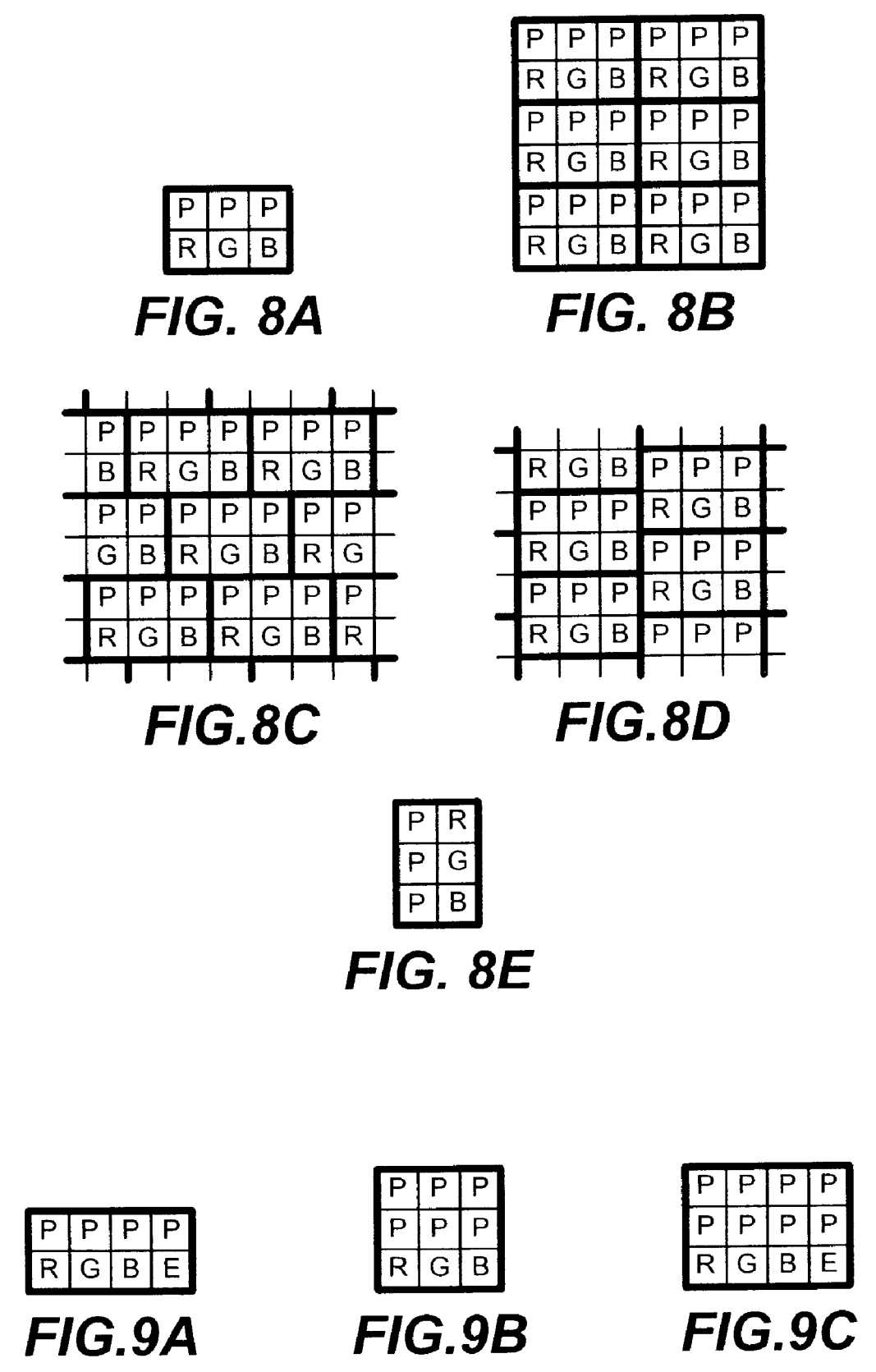

To this point the image sensor has been described as employing red, green, and blue filters such that there are two green pixels for every red and blue pixel. The present invention is also practiced with red, green, and blue filters in equal proportions as shown in FIG. 8A. The minimal repeating unit of FIG. 8A is used to tile the sensor array in several different ways, some of which are shown in FIGS. 8B-D. It will be understood that geometrically similar variations of these patterns, such as the minimal repeating unit of FIG. 8A, can be used. FIG. 8E shows a rotated form of the minimal repeating unit of FIG. 8A.

The present invention is also usable with pixels having more than three color photoresponses. FIG. 9A shows a variation of minimal repeating of FIG. 8A that uses four colors in addition to the panchromatic pixels. FIGS. 9B-C show additional variations of both of these patterns in which the single row of panchromatic pixels is replaced by a double row of panchromatic pixels. All of these patterns do not have a plurality of pixels of the same color. This fact and the preferred method for using such patterns will be discussed later.

Figures 10A, 10B, 10C, 10D, 10E, 10F, 11A, 11B:
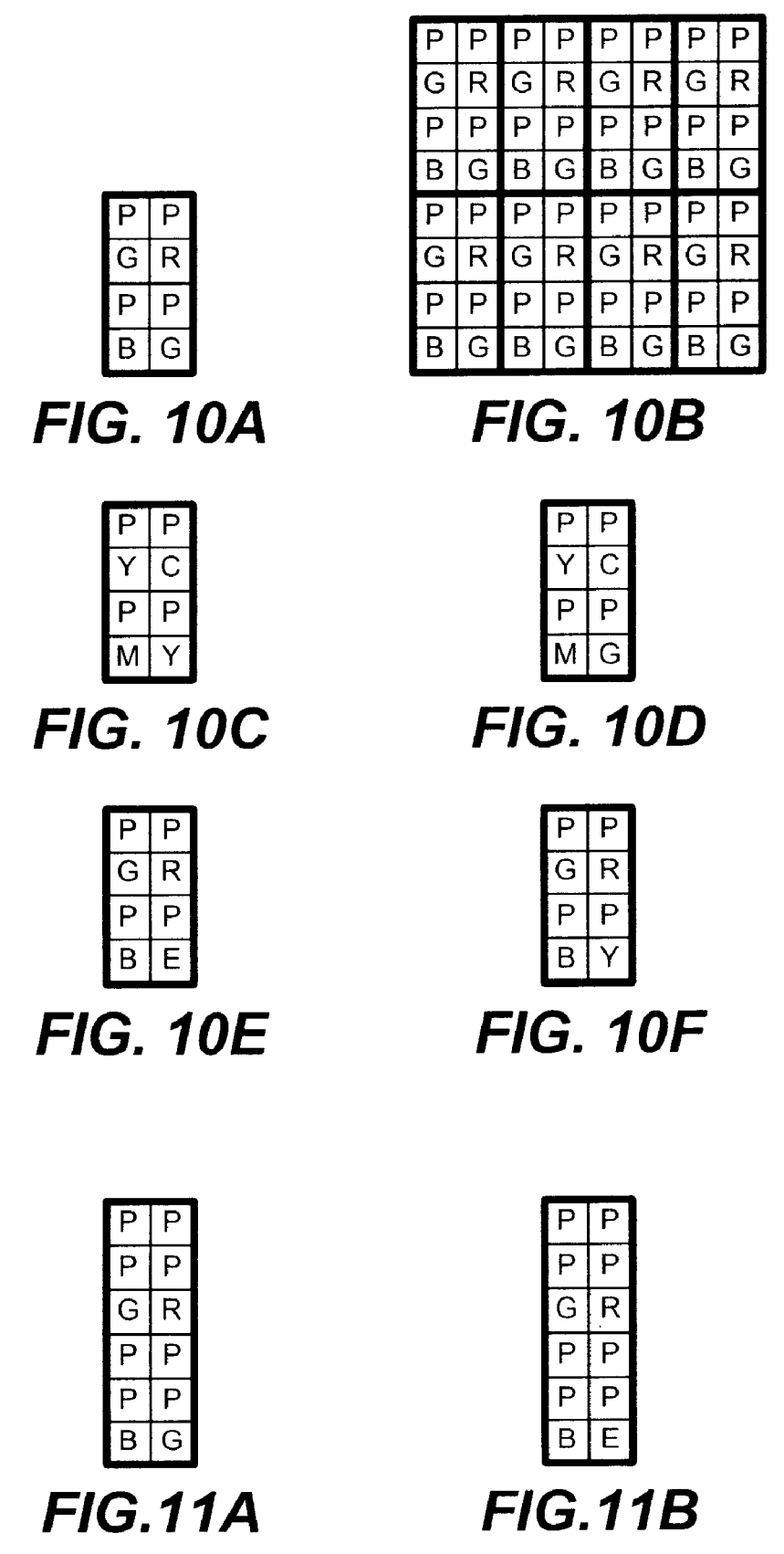

Another minimal repeating unit is shown in FIG. 10A that contains one red, two green, and one blue pixels. A tiling example, using this pattern, is shown in FIG. 10B.

Image sensors employing cyan, magenta, and yellow sensors are well known in the art, and the present invention is practiced with cyan, magenta, and yellow color filters. FIG. 10C shows the cyan, magenta, and yellow equivalent of FIG. 10A, with C representing cyan pixels, M representing magenta pixels, and Y representing yellow pixels.

FIG. 10D shows a minimal repeating unit of the present invention that includes cyan pixels (represented by C), magenta pixels (represented by M), yellow pixels (represented by Y), and green pixels (represented by G). FIG. 10E shows yet another alternative four color arrangement including red pixels (represented by R), blue pixels (represented by B), green pixels with one color photoresponse (represented by G), and alternative green pixels with a different color photoresponse (represented by E). FIG. 10F shows yet another alternative four color arrangement, wherein one of the green cells of FIG. 10A is replaced by a yellow cell, with the yellow pixels represented by Y.

FIG. 11A shows a variation of the pattern of FIG. 10A in which each row of panchromatic pixels is replaced by a double row of panchromatic pixels. An additional example, shown in FIG. 11B, is the same variation applied to the pattern of FIG. 10E.

The present invention is practiced with pixels arrays other than a rectangular array. FIG. 12A shows a variation of the pattern of FIG. 8A in which the pixels are octagonal and are arranged on a diagonal row. Because the pixel geometry is octagonal, there are small square vacancies located between horizontal and vertical neighbors that can be used for required sensor functionality such as data transfer circuitry. FIG. 12B shows an example of a tiling pattern using the minimal repeating unit of FIG. 12A. In FIG. 12B the panchromatic pixels appear in rows that are diagonal in nature. Likewise, the color pixels also appear in diagonally oriented rows.

FIG. 13A shows another variation of the pattern of FIG. 8A in which the pixels are hexagonal and arranged vertically. FIG. 13B shows an example of a tiling pattern using the minimal repeating unit of FIG. 13A. In FIG. 13B the panchromatic pixels appear in columns. Likewise, the color pixels also appear in columns.

FIG. 14 shows another minimal repeating unit using fewer panchromatic pixels than color pixels wherein the pixels are hexagonally packed and wherein the panchromatic pixels appear in rows that are diagonal in nature. Also, in FIG. 14, the color pixels appear in diagonally oriented rows. FIG. 15 shows another variation of the pattern of FIG. 13A. Within the scope of the present invention, it should be noted that rows and columns of pixels are not necessarily perpendicular to each other as is shown in FIGS. 12A-15.

Turning now to FIG. 16, the minimal repeating unit of FIG. 5 is shown subdivided into four cells, a cell being a contiguous subarray of pixels having fewer pixels than a minimal repeating unit. The software needed to provide the following processing is included in DSP 36 of FIG. 1. Cells 220, 224, 226, and 228 are examples of cells wherein these cells contain pixels having green, red, blue and green photoresponses, respectively. In this example, cell 220 contains both panchromatic pixels and green pixels, the green pixels being identified as pixel group 222. The eventual goal is to produce a single green signal for cell 220 by combining the eight green signals from the green pixels in pixel group 222. Depending on the image sensor's mode of operation, a single green signal is produced by combining all eight green signals in the analog domain (e.g. by charge binning), or multiple green signals are produced by combining smaller groups of pixels taken from pixel group 222. The panchromatic pixels of cell 220 are shown in FIG. 17A. In the following examples, all eight signals from these panchromatic pixels are individually digitized. The green pixels of cell 220 are shown in FIGS. 17B-17E wherein they are grouped together according to how their signals are combined. FIG. 17B depicts the case in which all eight green pixels are combined to produce a single green signal for cell 220 (FIG. 16). The sensor can produce two green signals, for example, by first combining the signals from pixels G21, G22, G23, and G24, and then combining the signals from pixels G41, G42, G43, and G44, as shown in FIG. 17C. Two signals are produced in other ways as well. The sensor can first combine signals from pixels G21, G22, G41, and G42, and then combine signals from pixels G23, G24, G43, and G44, as shown in FIG. 17D. The sensor can also produce four green signals for cell 220 by combining four pairs of signals, for example, combining pixels G21 with G22, then combining G23 with G24, then combining G41 with G42, and finally combining G43 with G44, as shown in FIG. 17E. It is clear that there are many additional ways to combine pairs of green signals within cell 220 (FIG. 16). If the sensor does no combining at all, then all eight green signals are reported individually for cell 220. Thus, in the case of cell 220, the sensor can produce one, two, four or eight green values for cell 220, and produce them in different ways, depending on its mode of operation.

For cells 224, 226, and 228 (FIG. 16), similar color signals are produced by the sensor depending on its mode of operation. The color signals for cells 224, 226, and 228 are red, blue, and green, respectively.

Returning to the case of cell 220, regardless of how many signals are digitized for this cell, the image processing algorithm of the present invention further combines the digitized green values to produce a single green value for the cell. One way that a single green value is obtained is by averaging all the digitized green values produced for cell 220. In the event that a cell contains color pixels of differing photoresponses, all the color data within the cell is similarly combined so that there is a single value for each color photoresponse represented within the cell.

It is important to distinguish between the color values pertaining to pixels in the original sensor that captured the raw image data, and color values pertaining to cells within the original sensor. Both types of color values are used to produce color images, but the resulting color images are of different resolution. An image having pixel values associated with pixels in the original sensor is referred to as a high-resolution image, and an image having pixel values associated with cells within the original sensor is referred to as a low-resolution image.

Figure 18:
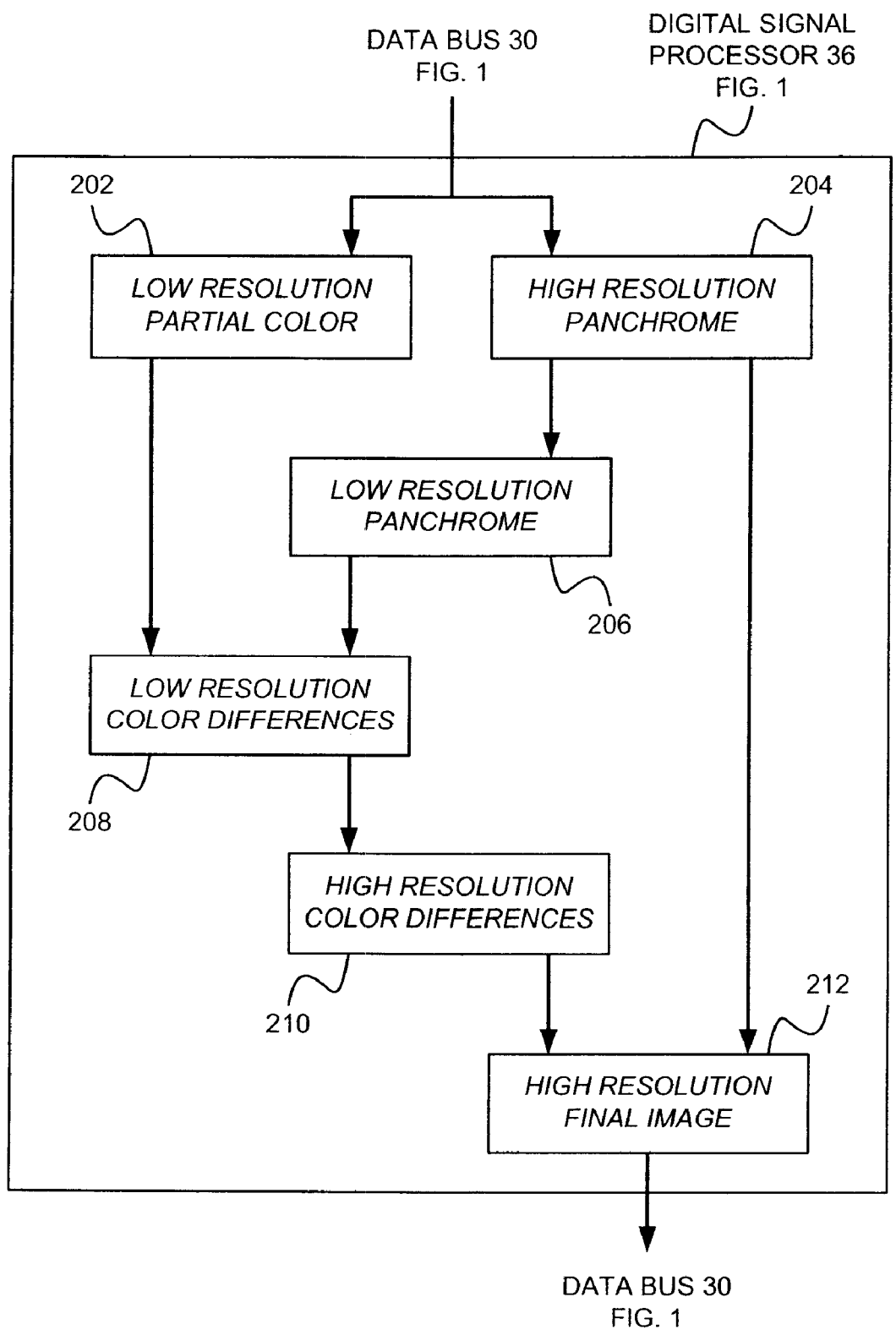
FIG. 18 is a process diagram of the present invention showing the method of processing the color and panchromatic pixel data from a sensor of the present invention.

Turning now to FIG. 18, the digital signal processor block 36 (FIG. 1) is shown receiving captured raw image data from the data bus 30 (FIG. 1). The raw image data is passed to both the Low-resolution Partial Color block 202 and the High-resolution Panchrome block 204. An example of a minimal repeating unit for an image sensor has already been shown in FIG. 5 and FIG. 16. In the case of cell 220 (FIG. 16), the captured raw image data includes the panchromatic data that is produced by the individual panchromatic pixels as shown in FIG. 17A. Also, for cell 220 (FIG. 16), one or more green (color) values are also included, for example, from the combinations shown in FIGS. 17B-E.

In the Low-resolution Partial Color block 202 (FIG. 18), a partial color image is produced from the captured raw image data, a partial color image being a color image wherein each pixel has at least one color value and each pixel is also missing at least one color value. Depending on the sensor's mode of operation, the captured raw data contains some number of color values produced by the color pixels within each cell. Within the Low-resolution Partial Color block 202, these color values are reduced to a single value for each color represented within the cell. For the cell 220 (FIG. 16), as an example, a single green color value is produced. Likewise, for cells 224, 226 and 228, a single red, blue and green color value is produced, respectively.

The Low-resolution Partial Color block 202 processes each cell in a similar manner resulting in an array of color values, one for each cell. Because the resulting image array is based on cells rather than pixels in the original sensor, it is four times smaller in each dimension than the original captured raw image data array. Because the resulting array is based on cells and because each pixel has some but not all color values, the resulting image is a low-resolution partial color image. At this point, the low-resolution partial color image is color balanced.

Looking now at the High-resolution Panchrome block 204, the same raw image data is used as shown in FIG. 16, although only the panchromatic values will be used (FIG. 17A). This time the task is to interpolate a complete high-resolution panchromatic image by estimating panchromatic values at those pixels not having panchromatic values already. In the case of cell 220 (FIG. 16), panchromatic values must be estimated for the green pixels in pixel group 222 (FIG. 16). One simple way to estimate the missing panchromatic values is to do vertical averaging. Thus, for example, we can estimate the panchromatic value at pixel 22 as follows:

$$P22=(P12+P32)/2$$

An adaptive method can also be used. For example, one adaptive method is to compute three gradient values and take their absolute values:

$$SCLAS=ABS\,(P31-P13)$$

$$VCLAS=ABS\,(P32-P12)$$

$$BCLAS=ABS\,(P33-P11)$$

using the panchromatic values are shown in FIG. 17A. Likewise, three predictor values are computed:

$$SPRED=(P31+P13)/2$$

$$VPRED=(P32+P12)/2$$

$$BPRED=(P33+P11)/2$$

Then, set P22 equal to the predictor corresponding to the smallest classifier value. In the case of a tie, set P22 equal to the average the indicated predictors. The panchromatic interpolation is continued throughout the image without regard to cell boundaries. When the processing of High-resolution Panchrome block 204 is done, the resulting digital panchromatic image is the same size as the original captured raw image, which makes it a high-resolution panchromatic image.

The Low-resolution Panchrome block 206 receives the high-resolution panchromatic image array produced by block 204 and generates a low-resolution panchromatic image array which is the same size as the low-resolution partial color image produced by block 202. Each low-resolution panchromatic value is obtained by averaging the estimated panchromatic values, within a given cell, for those pixels having color filters. In the case of cell 220 (FIG. 16) the high-resolution panchromatic values, previously estimated for the green pixels in pixel group 222 (FIG. 16), are now averaged together to produce a single low-resolution panchromatic value for the cell. Likewise, a single low-resolution panchromatic value is computed for cell 224 using high-resolution panchromatic values estimated at the pixels having red filters. In this manner, each cell ends up with a single low-resolution panchromatic value.

The Low-resolution Color Difference block 208 receives the low-resolution partial color image from block 202 and the low-resolution panchrome array from block 206. A low-resolution intermediate color image is then formed by color interpolating the low-resolution partial color image with guidance from the low-resolution panchrome image. The exact nature of the color interpolation algorithm, to be discussed in detail later, depends on which pattern of pixel photoresponses was used to capture the original raw image data.

After the low-resolution intermediate color image is formed it is color corrected. Once the low-resolution intermediate color image is color corrected, a low-resolution image of color differences is computed by subtracting the low-resolution panchromatic image from each of the low-resolution color planes individually. The High-resolution Color Difference block 210 receives the low-resolution color difference image from block 208 and, using bilinear interpolation, upsamples the low-resolution color difference image to match the size of the original raw image data. The result is a high-resolution color difference image that is the same size as the high-resolution panchromatic image produced by block 204.

The High-resolution Final Image block 212 receives the high-resolution color difference image from block 210 and the high-resolution panchromatic image from block 204. A high-resolution final color image is then formed by adding the high-resolution panchromatic image to each of the high-resolution color difference planes. The resulting high-resolution final color image can then be further processed. For example, it is stored in the DSP Memory block 32 (FIG. 1) and then sharpened and compressed for storage on the Memory Card block 64 (FIG. 1).

The sensor filter patterns shown in FIGS. 4A-D have a minimal repeating unit such that the resulting low-resolution partial color image, produced in block 202, exhibits the repeating Bayer pattern for color filters:

In addition to a single color value, given by the low-resolution partial color image, every cell also has a panchromatic value given by the low-resolution panchromatic image.

Considering the case in which the Bayer pattern is present in the low-resolution partial color image, the task of color interpolation within the Low-resolution Color Differences block 208 (FIG. 18) can now be described in greater detail. Color interpolation begins by interpolating the green values at pixels not already having green values, shown as pixel 234 in FIG. 19A. The four neighboring pixels, shown as pixels 230, 232, 236, and 238, all have green values and they also all have panchromatic values. The center pixel 234 has a panchromatic value, but does not have a green value as indicated by the question marks.

The first step is to compute two classifier values, the first relating to the horizontal direction, and the second to the vertical direction:

HCLAS=ABS $(P4-P2)$+ABS $(2*P3-P2-P4)$

VCLAS=ABS $(P5-P1)$+ABS $(2*P3-P1-P5)$

Then, compute two predictor values, the first relating to the horizontal direction, and the second to the vertical direction:

HPRED=$(G4+G2)/2+(2*P3-P2-P4)/2$

VPRED=$(G5+G1)/2+(2*P3-P1-P5)/2$

Finally, letting THRESH be an empirically determined threshold value, we can adaptively compute the missing value, G3, according to:

```
IF MAX( HCLAS, VCLAS ) < THRESH
    G3  = ( HPRED + VPRED )/2
ELSEIF VCLAS < HCLAS
    G3  = VPRED
ELSE
    G3  = HPRED
END
```

Thus, if both classifiers are smaller than the threshold value, an average of both predictor values is computed for G3. If not, then either HPRED or VPRED is used depending on which classifier HCLAS or VCLAS is smaller.

Figure 19A:
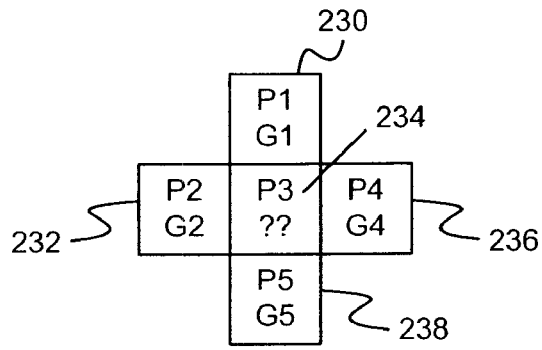
FIGS. 19A-D illustrates methods of the present invention for interpolating missing colors in the low-resolution partial color image of FIG. 18.
Figure 19B:
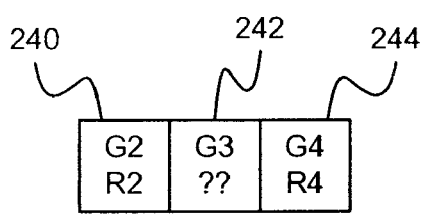

Once all the missing green values have been estimated, the missing red and blue values are interpolated. As shown in FIG. 19B, pixel 242 is missing a red value but its two horizontal neighbors, pixels 240 and 244, have red values R2 and R4 respectively. All three pixels have green values. Under these conditions, an estimate for the red value (R3) for pixel 242 is computed as follows:

$R3=(R4+R2)/2+(2*G3-G2-G4)/2$

Figure 19C:
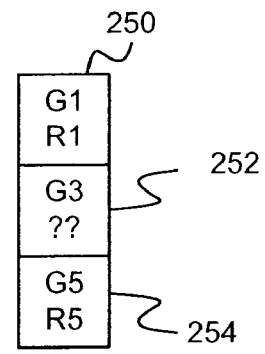

Missing blue values are computed in a similar way under similar conditions. At this point, the only pixels that still have missing red and blue values are those requiring vertical interpolation. As shown in FIG. 19C, pixel 252 is missing a red value and its two vertical neighbors, pixels 250 and 254, have red values R1 and R5 respectively. Under these conditions, an estimate for the red value (R3) for pixel 252 is computed as follows:

$R3=(R5+R1)/2+(2*G3-G1-G5)/2$

Missing blue values are computed in a similar way under similar conditions. This completes the interpolation of the low-resolution partial color image and the result is a low-resolution intermediate color image. As described earlier, the low-resolution color differences can now be computed by subtracting the low-resolution panchrome values from each color plane: red, green, and blue in the example just discussed.

Figure 20:
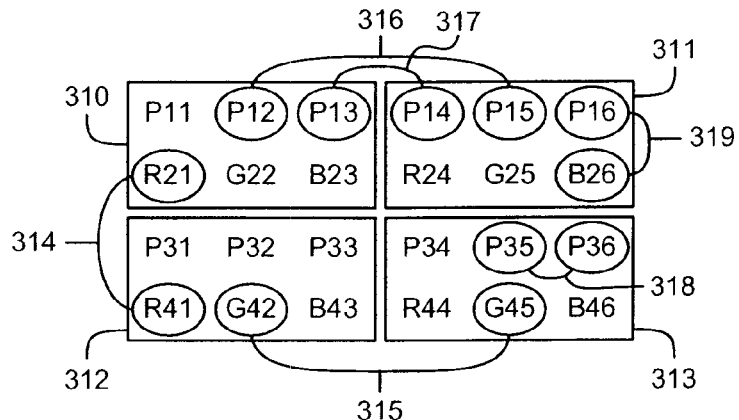
FIG. 20 provides two minimal repeating units of the type shown in FIG. 8A showing combining pixels between adjacent minimal repeating units as well as within of the minimal repeating units.

Turning now to FIG. 20, a partial tiling of a sensor is shown using four copies of the minimal repeating unit of FIG. 8A. The four minimal repeating units 310, 311, 312, and 313 each contain a red, green, and blue pixel. Although the earlier discussion of combining pixels was limited to like colored pixels within the same minimal repeating unit, as shown in FIG. 16 for example, the present invention can also be practiced by combining pixels from nearby minimal repeating units. As shown in FIG. 20, the red pixels R21 and R41 constitute a pair of pixels 314 that are combined in a vertical direction. Likewise, the green pixels G42 and G45 constitute a pair of pixels 315 that are combined in a horizontal direction. When the minimal repeating is relatively small, such as the pattern of FIG. 8A as used in FIG. 20, it is useful to combine like colored pixels from adjacent minimal repeating units.

It is useful to consider the combining described above with reference to FIG. 20 as occurring between adjacent minimal repeating units, where adjacency is defined as sharing a boundary of positive length between two minimal repeating units. Given this definition, the minimal repeating units 311 and 312 in FIG. 20 are adjacent to minimal repeating unit 310, but minimal repeating units 311 and 312 are not adjacent to each other. In the combining described above, pixels of like color from adjacent minimal repeating units are combined, where like color is defined as having a similar spectral photoresponse. Given this definition, all the red pixels R21, R24, R41, and R44 in FIG. 20 are pixels of like color and all the panchromatic pixels P11 through P16 and P31 through P36 are pixels of like color. In the combining described above, similarly positioned pixels from adjacent minimal repeating units are combined, where similarly positioned is defined as having the same relative position within each minimal repeating unit. For example, pixels G42 and G45 in FIG. 20 are similarly positioned and are combined as pair 315. Note that similarly positioned pixels must be pixels of like color.

Although combining has generally been described in the context of color pixels, it is sometimes useful to combine panchromatic pixels. In the case of low light levels or short exposure times, it is useful to combine panchromatic pixels to trade off panchromatic resolution to increase the signal strength of the combined panchromatic pixels. It is important to note that the definitions of adjacent minimal repeating unit, pixels of like color, and similarly positioned pixels apply to panchromatic pixels as well as to color pixels. For example, panchromatic pixels P12 and P15 in FIG. 20 are similarly positioned and are combined as the pair 316. Furthermore, panchromatic pixels P13 and P14 are pixels of like color (but are not similarly positioned) and are combined as the pair 317. Note that if there are multiple pixels of a single color within a minimal repeating unit, it is useful sometimes to combine pixels of like color within a minimal repeating unit. For example, panchromatic pixels P35 and P36 are pixels of like color within a minimal repeating unit that are combined as the pair 318.

The combining that has been described to this point includes combining pixels of like color or similarly positioned pixels from adjacent minimal repeating units. In some cases, it is useful to combined panchromatic pixels with color pixels. In FIG. 20, the combined pair 319 includes panchromatic pixel P16 and blue pixel B26. Combining panchromatic with color pixels is done, for example, when the light level is low or the exposure time is very short in order to increase the overall signal strength from the combined pixels. Although 319 shows the combination of a panchromatic pixel and a color pixel from within one minimal repeating unit, it is also useful to combine panchromatic pixels with color pixels from nearby minimal repeating units.

It is within the scope of the invention to combine at the same time within a given array of minimal repeating units similarly positioned pixels from adjacent minimal repeating units, pixels of like color from adjacent minimal repeating units, pixels of like color within a minimal repeating unit, and panchromatic and color pixels. It is also understood that a particular arrangement of combining methods is useful at one time depending on the image capture conditions, and a different arrangement is useful at a different time for different image capture conditions, so the combining arrangements can be adjusted dynamically at image capture time. For example, when the overall scene light level is high, panchromatic pixels are not combined, but when the overall scene light level is low, panchromatic pixels are combined with each other or with color pixels in order to improve the signal level.

Figure 21A:
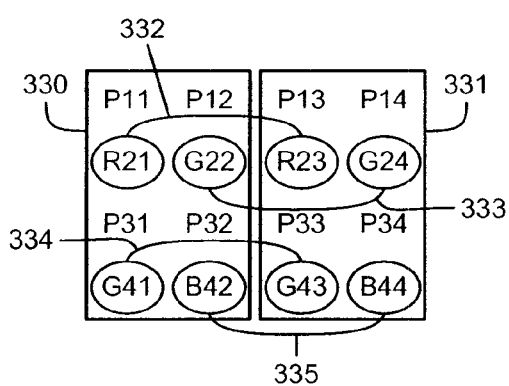
FIGS. 21A-D each provide two minimal repeating units that are a variant of FIG. 10A showing several ways of combining pixels between horizontally adjacent minimal repeating units and within minimal repeating units.
Figure 21B:
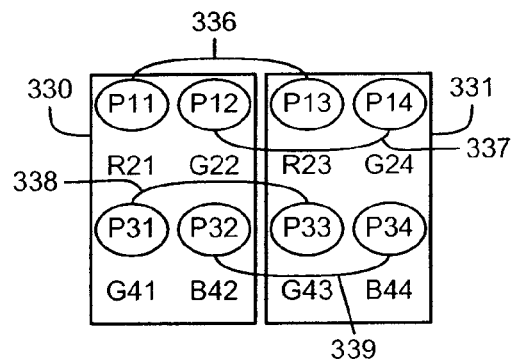

Examples of the various combining methods described above are shown in FIGS. 21 through 27. In FIGS. 21A-21D, two adjacent minimal repeating units 330 and 331 that are a variation of the type shown in FIG. 10A are shown. In FIG. 21A, all similarly positioned color pixels from the two minimal repeating units are combined as shown by pixel pairs 332, 333, 334, and 335. In FIG. 21B, all similarly positioned panchromatic pixels are combined as shown by pixels pairs 336, 337, 338, and 339.

Figure 21C:
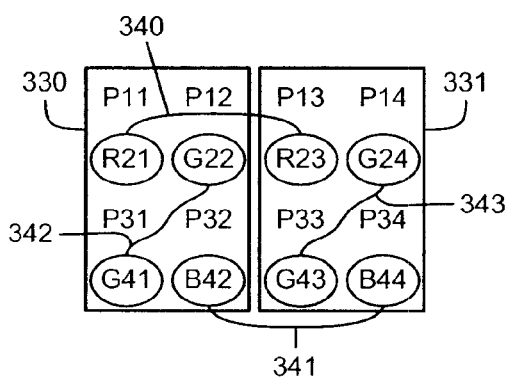

FIG. 21C shows combining pixels of like color within a minimal repeating unit at the same time as combining similarly positioned pixels between minimal repeating units. FIG. 21C includes two adjacent minimal repeating units 330 and 331 that are a variation of the type shown in FIG. 10A. Similarly positioned pixels R21 and R23 are combined as the pair 340, and similarly positioned pixels B42 and B44 are combined as the pair 341. G22 and G41 are pixels of like color that are located in minimal repeating unit 330, and they are shown combined as the pair 342; similarly, pixels G24 and G43 from minimal repeating unit 331 are shown combined as the pair 343.

Figure 21D:
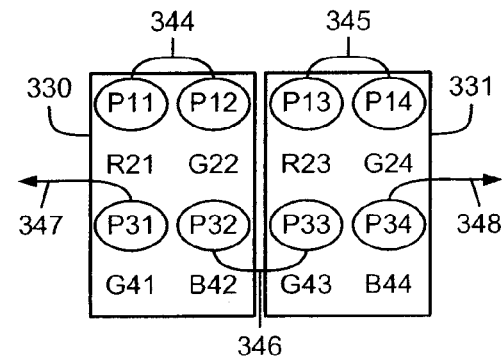

FIG. 21D shows combining panchromatic pixels within a minimal repeating unit at the same time as combining panchromatic pixels between minimal repeating units. FIG. 21D includes two adjacent minimal repeating units 330 and 331 that are a variation of the type shown in FIG. 10A. P11 and P12 are panchromatic pixels that are located in minimal repeating unit 330, and they are shown combined as the pair 344; similarly, pixels P13 and P14 from minimal repeating unit 331 are shown combined as the pair 345. Panchromatic pixels P32 and P33 are in different minimal repeating units, and they are shown combined as the pair 346. Uncombined panchromatic pixels P31 and P34 are left uncombined or are combined with pixels from adjacent minimal repeating units as shown by the arrows 347 and 348.

Figure 22:
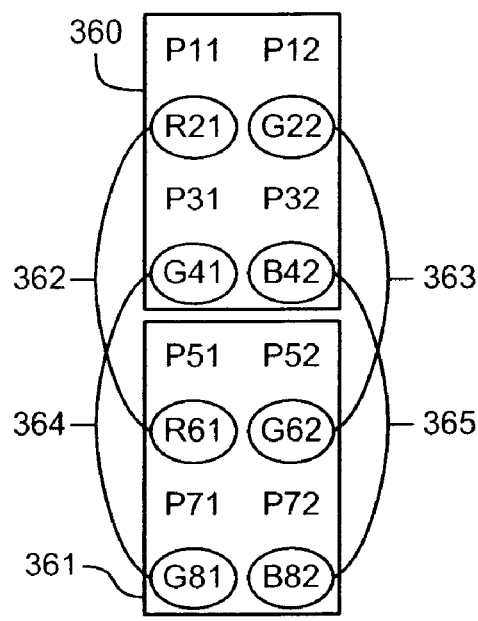
FIG. 22 provides two minimal repeating units that are a variant of FIG. 10A showing combining pixels between vertically adjacent minimal repeating units.

While the minimal repeating units of FIGS. 21A-21D are arranged horizontally, FIG. 22 shows two adjacent minimal repeating units 360 and 361 that are arranged vertically, with similarly positioned color pixels combined as shown by pixel pairs 362, 363, 364, and 365.

Figure 23:
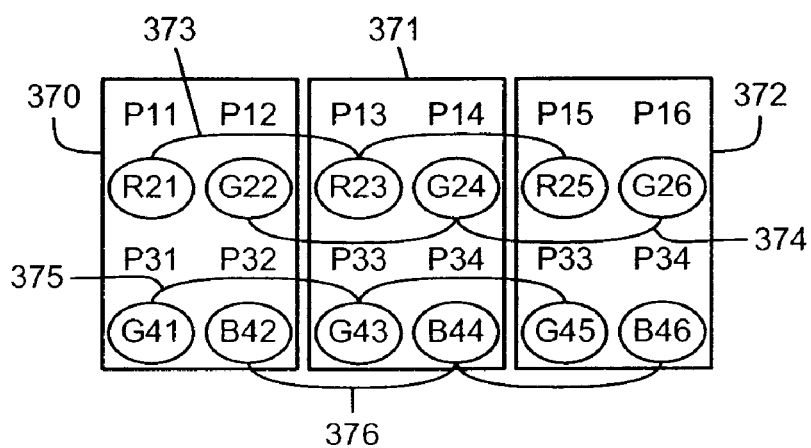
FIG. 23 provides three minimal repeating units that are a variant of FIG. 10A showing combining pixels from three horizontally adjacent minimal repeating units.

In addition to combining pixels in pairs from two adjacent minimal repeating units, it is useful to combine pixels from three or more minimal repeating units. FIG. 23, for example, shows three adjacent minimal repeating units 370, 371, and 372 that are a variation of the type shown in FIG. 10A. Pixels of like color (that are also similarly positioned) are shown combined in threes as the pixel triplets 373, 374, 375, and 376.

Figure 24:
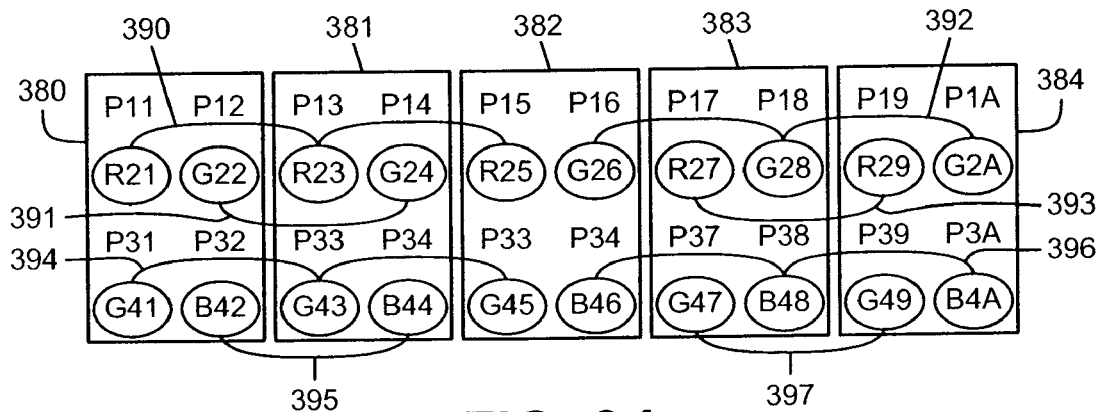
FIG. 24 provides five minimal repeating units that are a variant of FIG. 10A showing combining pixels from five horizontally adjacent minimal repeating units.

FIG. 24 shows five adjacent minimal repeating units 380, 381, 382, 383, and 384 that are a variation of the type shown in FIG. 10A with pixels of like color shown combined as red triplet 390, green pair 391, green triplet 392, red pair 393, green triplet 394, blue pair 395, blue triplet 396, and green pair 397. This particular arrangement produces combined pixel pairs that are evenly spaced. Combination 390 produces a combined red result that is located at the position of R23 (assuming pixels R21, R23, and R25 are equally weighted in the combining process), and combination 391 produces a combined green result that is located also at the position of R23. Similarly, there is a red-green combined pair at the position of G28, a green-blue combined pair at the position of G43, and a green-blue combined pair at the position of B48. Pixel positions R23, G28, G43, and B48 are evenly spaced within the group of five minimal repeating units and, if this group of five minimal repeating units and combined pixels is repeated to create a larger array of minimal repeating units, the resulting combined pixels are evenly spaced throughout the resulting array. Contrast this with the combining arrangement shown in FIG. 23: if this group of three minimal repeating units and combined pixels is repeated to create a larger array, the resulting combined pixels are concentrated in the center of each group of three minimal repeating units and are therefore not spaced evenly throughout the array.

Figure 25A:
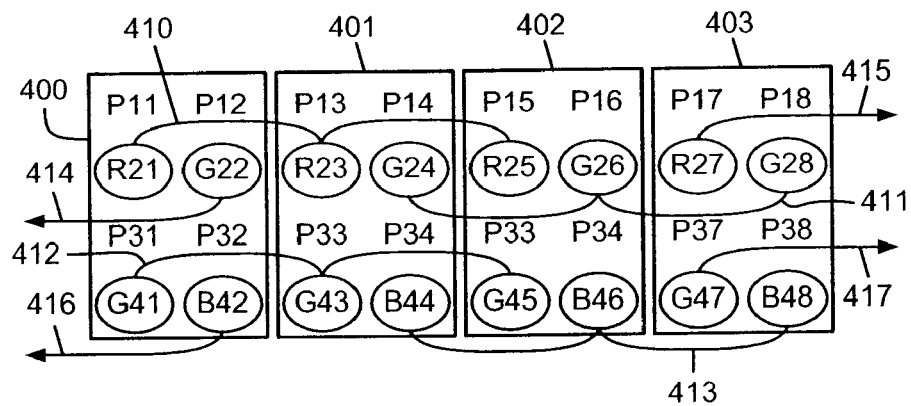
FIGS. 25A-B provides several minimal repeating units that are a variant of FIG. 10A showing multiple overlapping groups of minimal repeating units for the purpose of combining pixels from adjacent minimal repeating units.

FIG. 25A shows four adjacent minimal repeating units 400, 401, 402, and 403 that are a variation of the type shown in FIG. 10A. In FIG. 25A, some pixels of like color are combined within the group of four minimal repeating units, while other pixels are combined with pixels from minimal repeating units that are adjacent to this group of four. Specifically, pixels R21, R23, and R25 are combined as the triplet 410, pixels G24, G26, and G28 are combined as the triplet 411, pixels G41, G43, and G45 are combined as the triplet 412, and pixels B44, B46, and B48 are combined as the triplet 413. This leaves several color pixels that are left uncombined or are combined with pixels from adjacent minimal repeating units: for example, pixel G22 is combined with pixels from minimal repeating units to the left of the group of four as shown by arrow 414. Similarly, pixel B42 is combined with pixels from adjacent minimal repeating units to the left as shown by the arrow 416, and pixels R27 and G47 are combined with pixels from adjacent minimal repeating units to the right as shown by arrows 415 and 417, respectively. In FIG. 25A, all similarly positioned color pixels from the middle two minimal repeating units, 401 and 402, are combined, with some of these combined pixels further combined with similarly positioned color pixels from a minimal repeating unit to the left, 400, and other combined pixels further combined with similarly positioned color pixels from a minimal repeating unit to the right, 403.

Figure 25B:
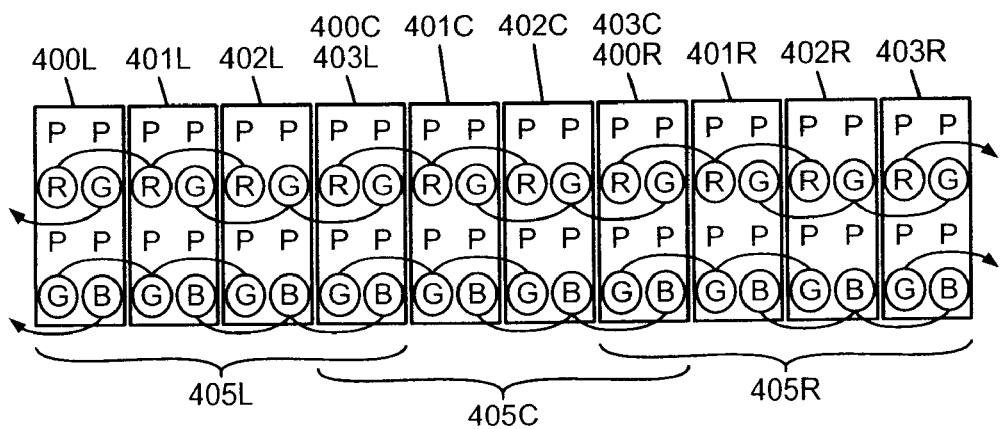

If a minimal repeating unit of the type exemplified by 400 through 403 in FIG. 25A is tiled to create a larger array, the combining arrangement shown in FIG. 25A is extended to cover an array of minimal repeating units as shown in FIG. 25B. In FIG. 25B are shown three overlapping groups of four minimal repeating units: 405L, 405C, and 405R. Group 405L is composed of minimal repeating units 400L, 401L, 402L, and 403L that correspond for combining purposes to minimal repeating units 400, 401, 402, and 403 respectively of FIG. 25A. Similarly, group 405C is composed of minimal repeating units 400C, 401C, 402C, and 403C that also correspond to minimal repeating units 400, 401, 402, and 403 of FIG. 25A, and group 405R is composed of minimal repeating units 400R, 401R, 402R, and 403R that also correspond to minimal repeating units 400, 401, 402, and 403 of FIG. 25A. Note that minimal repeating unit 403L of group 405L is also minimal repeating unit 400C of group 405C, and minimal repeating unit 403C of group 405C is also minimal repeating unit 400R of group 405R. Hence, minimal repeating unit 403L/400C is where groups 405L and 405C overlap, and minimal repeating unit 403C/400R is where groups 405C and 405R overlap. The curved lines contained within each group of four minimal repeating units, 405L, 405C, and 405R, connect the pixels that are combined as shown by 410, 411, 412, and 413 in FIG. 25A. The curved lines that extend outside a group connect to an adjacent and overlapping group and correspond to 414, 415, 416, and 417 in FIG. 25A. It is clear that the combining arrangement shown in FIGS. 25A and 25B provides combined results for the color pixels that are evenly spaced. Furthermore, the combined color pixels represent a Bayer arrangement of colors.

Note that the minimal repeating unit is the tiling unit that is used to create larger arrays of pixels. The groups of minimal repeating units shown in FIGS. 24, 25A, and 25B are for combining purposes only, not for tiling purposes. In some cases the combining is contained entirely within the group of minimal repeating units, as shown in FIG. 24, and in some cases the combining extends outside the group as shown in FIG. 25A. In some cases where the combining extends outside a group of minimal repeating units, representative groups of minimal repeating units are overlapped for combining purposes as shown in FIG. 25B. Note that minimal repeating units are grouped in one arrangement for combining some pixels, and are group in another arrangement for combining other pixels. For example, minimal repeating units are grouped in one arrangement to combine color pixels and are grouped in a different arrangement to combine panchromatic pixels.

Although the examples in the foregoing paragraphs have used minimal repeating units that are variations of the type shown in FIG. 10A, it is clearly understood that these combining arrangements are used with other types of minimal repeating units. For example, replacing the minimal repeating units in FIGS. 21 through 25 with minimal repeating units that are variations of the type shown in FIG. 11 produces similar combined results and is entirely within the scope of this invention.

Figure 26A:
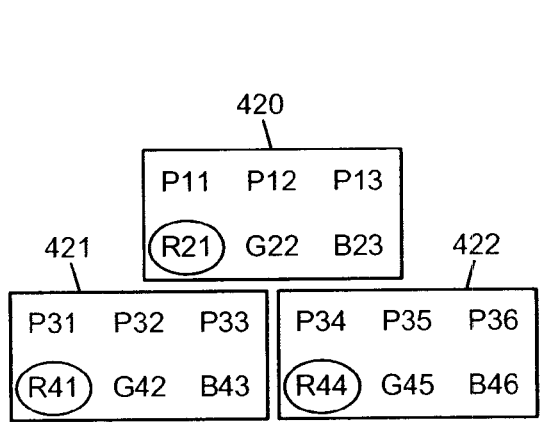
FIGS. 26A-B provides several minimal repeating units of the type shown in FIG. 8A showing combining pixels from multiple mutually adjacent minimal repeating units.
Figure 26B:
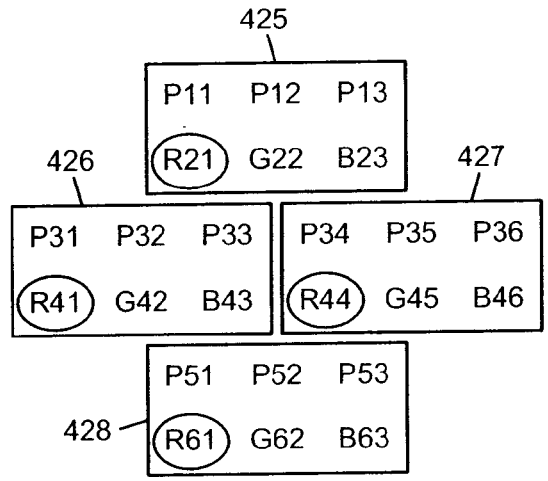

The foregoing examples have all shown minimal repeating units that are arranged linearly, either in rows or columns. It is also useful to arrange adjacent minimal repeating units in other ways for the purpose of combining pixels. FIG. 20 provides one such example in which four minimal repeating units are arranged in two rows and two columns. Another example is shown in FIG. 26A, which has three minimal repeating units 420, 421, and 422 of the type shown in FIG. 8A. The three minimal repeating units are arranged so that each minimal repeating unit is adjacent to the others. Pixels of similar color within this group of three are combined: for example, pixels R21, R41, and R44 are combined. This arrangement of three mutually adjacent minimal repeating units is repeated to produce a larger array of pixels. As another example of mutual adjacency within a group of minimal repeating units, FIG. 26B has four minimal repeating units 425, 426, 427, and 428 of the type shown in FIG. 8A, with each of the four minimal repeating units adjacent to at least two others within the group of four. Pixels of similar color with this group of four are combined: for example, pixels R21, R41, R44, and R61 are combined.

Figure 27:
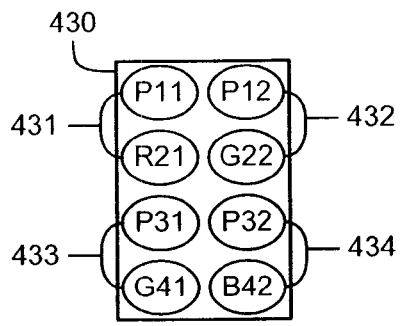
FIG. 27 provides a minimal repeating unit that is a variant of FIG. 10A showing combining color pixels with panchromatic pixels.

FIG. 27 shows combining panchromatic pixels with color pixels. Minimal repeating unit 430 is a variation of the type shown in FIG. 10A. Pixels P11 and R21 form the combined pair 431, pixels P12 and G22 form the combined pair 432, pixels P31 and G41 form the combined pair 433, and pixels P32 and B42 form the combined pair 434.

Figure 28:
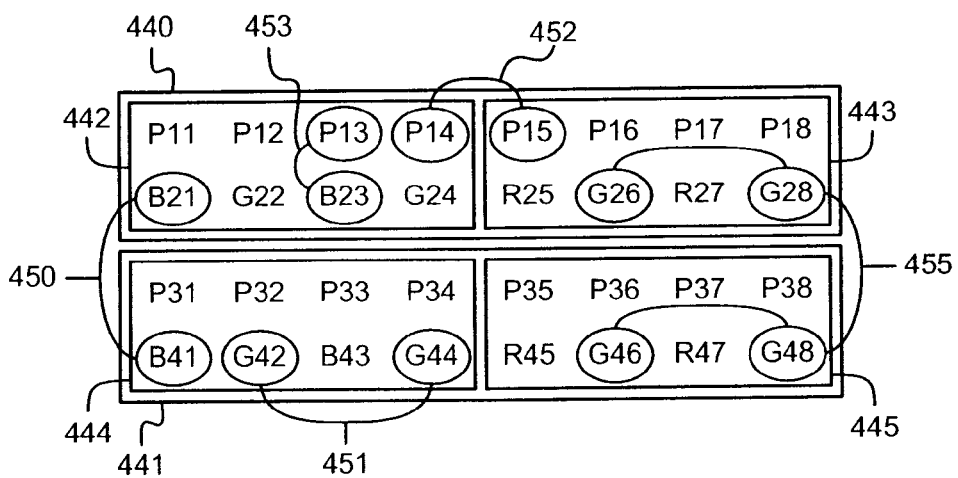
FIG. 28 provides two minimal repeating units that are a variation of the present invention that include cells showing combining pixels between minimal repeating units, between cells, and within cells, as well as combining color and panchromatic pixels.

Turning now to FIG. 28, a minimal repeating unit having 16 pixels is shown having two copies, minimal repeating units 440 and 441. The top minimal repeating unit 440 is subdivided into two cells 442 and 443. Cell 442 contains a horizontal row of four panchromatic pixels P11, P12, P13, and P14, two blue pixels B21 and B23, and two green pixels G22 and G24. Cell 443 contains a horizontal row of four panchromatic pixels P15, P16, P17, and P18, two red pixels R25 and R27 and two green pixels G26 and G28. The bottom minimal repeating unit 441 is subdivided into two cells 444 and 445 that contain similar patterns of pixels as cells 442 and 443, respectively. Given a minimal repeating unit that includes cells as shown in FIG. 28, there are several ways to combine pixels. In FIG. 28, pixels B21 and B41 from adjacent minimal repeating units 440 and 441 provide the combined pixel pair 450. Pixels G42 and G44 from the cell 444 provide the combined pixel pair 451. Pixels P14 and P15 are panchromatic pixels from cells 442 and 443 respectively that provide the pixel pair 452. Panchromatic pixel P13 is combined with color pixel B23 to provide the combined pixel pair 453.

As has been previously shown, the present invention includes combining an arbitrary number of pixels, both within a single minimal repeating unit and among multiple adjacent minimal repeating units. As shown in FIG. 28, the green pixels G26, G28, G46, and G48 constitute a four-tuple of combined pixels 455 all of which are combined to produce a single color value. This four-fold combination simultaneously includes combining pixels horizontally and vertically, as well as combining a plurality of pixels from within a single minimal repeating unit, and pixels taken from multiple adjacent minimal repeating units.

Figure 29A:
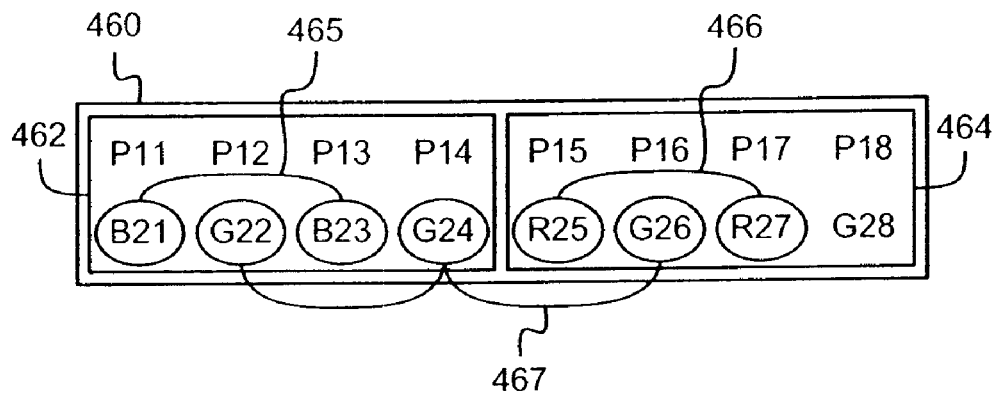
FIGS. 29A-C provides a minimal repeating unit that is a variation of the present invention that includes cells showing specific examples of combining pixels between minimal repeating units, between cells, and within cells.
Figure 29B:
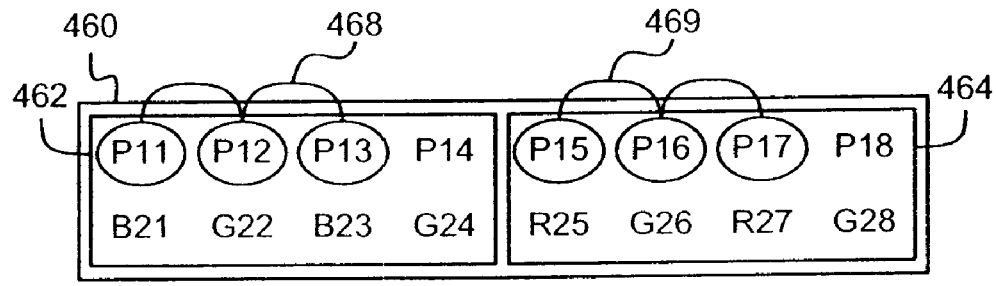
Figure 29C:
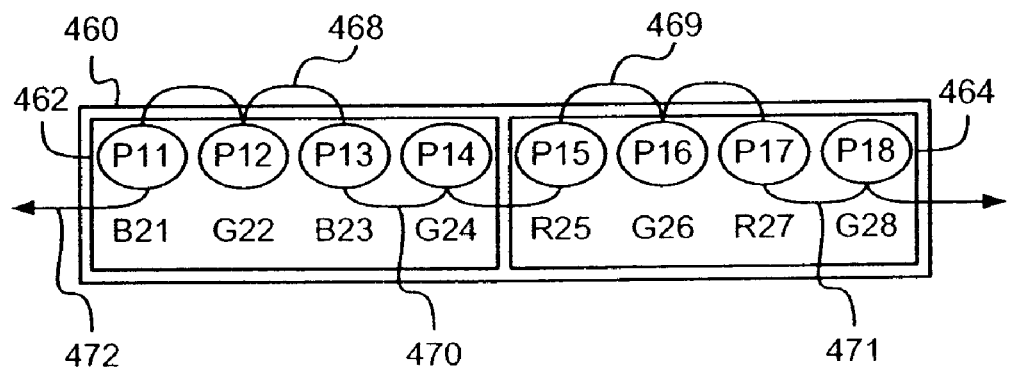

Each of FIGS. 29A-C shows a minimal repeating unit 460 of the type shown in FIG. 28. The minimal repeating unit 460 is composed of two cells, 462 and 464. In FIG. 29A, pixels B21 and B23 from within cell 462 provide the combined pixel pair 465. Similarly, pixels R25 and R27 from within cell 464 provide the combined pixel pair 466. Pixels G22 and G24 from within cell 462 and combined with pixel G26 from cell 464 to provide the combined pixel triplet 467. The red and blue combined pixels are contained entirely within their respective cells, while the green combined pixels come from two different cells. This particular combining arrangement has an advantage with respect to placement of the combined results: the centroid of the combined blue pixel pair 465 is at the position of pixel G22, the centroid of the combined green pixel triplet 467 is at the position of pixel G24, the centroid of the combined red pixel pair 466 is at the position of pixel G26, while the uncombined green pixel G28 remains at its current position. Hence, the combined color pixels' centroids along with the uncombined green pixel are evenly spaced, thereby minimizing aliasing in the sampling process.

FIG. 29B shows combining panchromatic pixels from within the cells of minimal repeating unit 460. Panchromatic pixels P11, P12, and P13 provide the combined pixel triplet 468, and panchromatic pixels P15, P16, and P17 provide the combined pixel triplet 469. As with the arrangement of combining color pixels in FIG. 29A, the combining arrangement of FIG. 29B has an advantage with respect to placement of the combined results: the centroid of the combined pixel triplet 468 is at the position of pixel P12, the centroid of the combined pixel triplet 469 is at the position of pixel P16, while the uncombined panchromatic pixels P14 and P18 remain at their current positions. Hence, the combined panchromatic pixels' centroids along with the uncombined panchromatic pixels are evenly spaced. Furthermore, these evenly spaced combined and uncombined panchromatic pixels are arranged vertically above the corresponding combined and uncombined color pixels shown in FIG. 29A, potentially simplifying the interpolation process.

FIG. 29C shows additional combinations of panchromatic pixels: pixels P13 and P14 from cell 462 are combined with pixel P15 from cell 464 to provide the combined panchromatic triplet 470; pixels P 17 and P 18 from cell 464 are combined with the leftmost pixel from a minimal repeating unit to the right of minimal repeating unit 460 to form the combined panchromatic pixel triplet 471; and pixel P11 from cell 462 is combined with the rightmost two panchromatic pixels from a minimal repeating unit to the left of minimal repeating unit 460 to form the combined panchromatic pixel triplet 472. As with the combined and uncombined panchromatic pixels in FIG. 29B, the four combined panchromatic pixel triplets in FIG. 29C have their centroids evenly spaced. FIG. 29 demonstrates that individual pixels are used in multiple combinations as well as being used only once: Pixel P11 is used twice, once in combination 472 and once in combination 468; pixel P13 is used in combinations 468 and 470; pixel P15 is used in combinations 470 and 469, and pixel P17 is used in combinations 469 and 471.

Figure 19D:
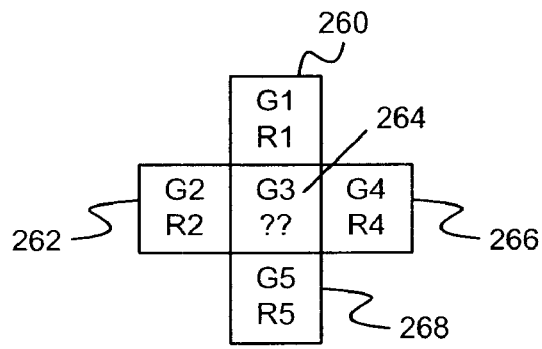

Not all sensors produce low-resolution partial color images exhibiting a repeating Bayer pattern of color values. For example, the sensor pattern shown in FIG. 28 and FIGS. 29A-C determines that two adjacent minimal repeating units generate two pairs of color values. In each case, a pair of cells from adjacent minimal repeating units produces color values for a low-resolution color representation of the image. The pair of cells 442 and 444 provide a blue and a green color value by combining pixels B21, B23, B41, and B43 for the blue value and by combining pixels G22, G24, G42, and G44 for the green value. Likewise, the pair of cells 443 and 445 provide a red and a green color value by combining pixels R25, R27, R45, and R47 for the red value and by combining pixels G26, G28, G46, and G48 for the green value. This pattern of combining pixels between cells from adjacent minimal repeating units is repeated over the entire sensor. The result is a low-resolution representation of the image wherein each low-resolution pixel has a green color value and either a red or a blue color value. At this point, the color interpolation task within the Low-resolution Color Differences block 208 (FIG. 18) estimates missing values of red or missing values of blue for each pixel. Referring to FIG. 19D, a pixel 264 is shown having a green value (G3) but not having a red value (R3). Four of the neighboring pixels 260, 262, 266, and 268 have green values and red values. The method for interpolating the red value for pixel 264 (FIG. 19D) is similar to the method used to interpolate the green value for pixel 234 (FIG. 19A).

The first step is to compute two classifier values, the first relating to the horizontal direction, and the second to the vertical direction:

$$HCLAS = ABS(G4-G2) + ABS(2*G3-G2-G4)$$

$$VCLAS = ABS(G5-G1) + ABS(2*G3-G1-G5)$$

Then, compute two predictor values, the first relating to the horizontal direction, and the second to the vertical direction:

$$HPRED = (R4+R2)/2 + (2*G3-G2-G4)/2$$

$$VPRED = (R5+R1)/2 + (2*G3-G1-G5)/2$$

Finally, letting THRESH be an empirically determined threshold value, the missing value G3 is computed adaptively according to:

```
IF MAX( HCLAS, VCLAS ) < THRESH
    R3  = ( HPRED + VPRED )/2
ELSEIF VCLAS < HCLAS
    R3  = VPRED
ELSE
    R3  = HPRED
END
```

Thus, if both classifiers are smaller than the threshold value, an average of both predictor values is computed for R3. If not, then either HPRED or VPRED is used depending on which classifier HCLAS or VCLAS is smaller.

The missing blue values are interpolated in exactly the same way using blue values in place of red. Once completed, the low-resolution intermediate color image has been produced. From there, the low-resolution color differences are computed as previously described.

The invention has been described in detail with particular reference to certain preferred embodiments thereof, but it will be understood that variations and modifications are effected within the spirit and scope of the invention.

Parts List 10 light from subject scene
11 imaging stage
12 lens
13 neutral density filter
14 iris
16 brightness sensor
18 shutter
20 image sensor
22 analog signal processor
24 analog to digital (A/D) converter
26 timing generator
28 image sensor stage
30 digital signal processor (DSP) bus
32 digital signal processor (DSP) memory
36 digital signal processor (DSP)
38 processing stage
40 exposure controller
50 system controller
52 system controller bus
54 program memory
56 system memory
57 host interface
60 memory card interface
62 memory card socket
64 memory card
68 user control and status interface 70 viewfinder display
72 exposure display
74 user inputs
76 status display
80 video encoder
82 display controller
88 image display
100 minimal repeating unit for Bayer pattern
102 repeating unit for Bayer pattern that is not minimal
110 spectral transmission curve of infrared blocking filter
112 unfiltered spectral photoresponse curve of sensor
114 red photoresponse curve of sensor
116 green photoresponse curve of sensor
118 blue photoresponse curve of sensor
120 first green cell
122 red cell
124 blue cell
126 second green cell
202 low-resolution partial color block
204 high-resolution panchromatic block
206 low-resolution panchromatic block
208 low-resolution color differences block
210 high-resolution color differences block
212 high-resolution final image block
220 first green cell
222 green pixels in first green cell
224 red cell
226 blue cell
228 second green cell
230 upper pixel values for interpolating missing green value
232 left pixel values for interpolating missing green value
234 pixel with missing green value
236 right pixel values for interpolating missing green value
238 lower pixel values for interpolating missing green value
240 left pixel values for interpolating missing red value
242 pixel with missing red value
244 right pixel values for interpolating missing red value
250 upper pixel values for interpolating missing red value
252 pixel with missing red value
254 lower pixel values for interpolating missing red value
260 upper pixel values for interpolating missing red value
262 left pixel values for interpolating missing red value
264 pixel with missing red value
266 right pixel values for interpolating missing red value
268 lower pixel values for interpolating missing red value
310 upper left minimal repeating unit
311 upper right minimal repeating unit
312 lower left minimal repeating unit
313 lower right minimal repeating unit
314 example of combining red pixels from vertically adjacent minimal repeating units
315 example of combining green pixels from horizontally adjacent minimal repeating units
316 example of combining similarly positioned panchromatic pixels from horizontally adjacent minimal repeating units
317 example of combining adjacent panchromatic pixels from horizontally adjacent minimal repeating units
318 example of combining adjacent panchromatic pixels from within a minimal repeating unit
319 example of combining a panchromatic pixel with a color pixel
330 left minimal repeating unit
331 right minimal repeating unit
332 combined similarly positioned red pixels
333 combined similarly positioned green pixels
334 combined similarly positioned green pixels
335 combined similarly positioned blue pixels
336 combined similarly positioned panchromatic pixels
337 combined similarly positioned panchromatic pixels
338 combined similarly positioned panchromatic pixels
339 combined similarly positioned panchromatic pixels
340 combined similarly positioned red pixels
341 combined similarly positioned blue pixels
342 combined green pixels from within a minimal repeating unit
343 combined green pixels from within a minimal repeating unit
344 combined panchromatic pixels from within a minimal repeating unit
345 combined panchromatic pixels from within a minimal repeating unit
346 combined panchromatic pixels from between two minimal repeating units
347 panchromatic pixel combined with a pixel from an adjacent minimal repeating unit
348 panchromatic pixel combined with a pixel from an adjacent minimal repeating unit
360 upper minimal repeating unit
361 lower minimal repeating unit
362 combined similarly positioned red pixels
363 combined similarly positioned green pixels
364 combined similarly positioned green pixels
365 combined similarly positioned blue pixels
370 left minimal repeating unit
371 center minimal repeating unit
372 right minimal repeating unit
373 combined similarly positioned red pixels
374 combined similarly positioned green pixels
375 combined similarly positioned green pixels
376 combined similarly positioned blue pixels
380 left minimal repeating unit
381 center-left minimal repeating unit
382 center minimal repeating unit
383 center-right minimal repeating unit
384 right minimal repeating unit
390 combining similarly positioned red pixels
391 combined similarly positioned green pixels
392 combined similarly positioned green pixels
393 combining similarly positioned red pixels
394 combined similarly positioned green pixels
395 combined similarly positioned blue pixels
396 combined similarly positioned blue pixels
397 combined similarly positioned green pixels
400 left minimal repeating unit
401 center-left minimal repeating unit
402 center-right minimal repeating unit
403 right minimal repeating unit
410 combined similarly positioned red pixels
411 combined similarly positioned green pixels
412 combined similarly positioned green pixels
413 combined similarly positioned blue pixels
414 green pixel combined with a pixel from an adjacent minimal repeating unit
415 red pixel combined with a pixel from an adjacent minimal repeating unit
416 blue pixel combined with a pixel from an adjacent minimal repeating unit
417 green pixel combined with a pixel from an adjacent minimal repeating unit
400L left minimal repeating unit from left group
401L center-left minimal repeating unit from left group
402L center-right minimal repeating unit from left group
403L right minimal repeating unit from left group 400C left minimal repeating unit from center group
401C center-left minimal repeating unit from center group
402C center-right minimal repeating unit from center group
403C right minimal repeating unit from center group
400R left minimal repeating unit from right group
401R center-left minimal repeating unit from right group
402R center-right minimal repeating unit from right group
403R right minimal repeating unit from right group
405L left group of four minimal repeating units
405C center group of four minimal repeating units
405R right group of four minimal repeating units
420 upper minimal repeating unit
421 lower left minimal repeating unit
422 lower right minimal repeating unit
425 upper minimal repeating unit
426 middle-left minimal repeating unit
427 middle-right minimal repeating unit
428 lower minimal repeating unit
430 minimal repeating unit
431 combined panchromatic and red pixel
432 combined panchromatic and green pixel
433 combined panchromatic and green pixel
434 combined panchromatic and blue pixel
440 upper minimal repeating unit
441 lower minimal repeating unit
442 left cell in upper minimal repeating unit
443 right cell in upper minimal repeating unit
444 left cell in lower minimal repeating unit
445 right cell in lower minimal repeating unit
450 combined similarly positioned blue pixels
451 combined green pixels from within a cell
452 combined panchromatic pixels from between two cells in a minimal repeating unit
453 combined panchromatic and blue pixel from within a cell
455 combined green pixels from within cells and between cells in different minimal repeating units
460 minimal repeating unit
462 left cell in minimal repeating unit
464 right cell in minimal repeating unit
465 combined blue pixels from within a cell
466 combined red pixels from within a cell
467 combined green pixels from within a cell and between two cells
468 combined panchromatic pixels from within a cell
469 combined panchromatic pixels from within a cell
470 combined panchromatic pixels from within a cell and between two cells
471 combined pancharomatic pixels from within a cell combined with one or more pixels from an adjacent minimal repeating units
472 panchromatic pixel combined with one or more pixels from an adjacent minimal repeating unit

The invention claimed is:

1. An image sensor for capturing a color image, comprising:
   a) a two-dimensional array having first and second groups of pixels, arranged in rows and columns, wherein pixels from the first group of pixels have narrower spectral photoresponses than pixels from the second group of pixels and wherein the first group of pixels has pixels that have spectral photoresponses that correspond to a set of at least two colors;
   b) the placement of the first and second groups of pixels defining a pattern that has a minimal repeating unit including at least six pixels, so that at least some rows or columns of the minimal repeating unit are composed only of pixels from the second group,
   c) means for combining similarly positioned pixels from at least two adjacent minimal repeating units, and
   d) wherein the minimal repeating unit of the image sensor is:

| | |
|---|---|
| P | P |
| A | B |
| P | P |
| B | C | wherein P represents pixels of the second group,
A represents pixels of a first color of pixels of the first group,
B represents pixels of a second color of pixels of the first group, and
C represents pixels of a third color of pixels of the first group.

2. The image sensor of claim 1 wherein pixels are combined by binning the charge from the pixels, by averaging the voltages produced by the pixels, or by first converting the pixel values to digital numbers and then combining the digital numbers, or combinations thereof.

3. The image sensor of claim 2 wherein the voltages are averaged by first charging capacitors to the voltages produced by the pixels and then connecting the capacitors together to average the voltages, with the capacitors being of equal sizes to perform a simple average or of differing sizes to perform a weighted average.

4. An image sensor for capturing a color image, comprising:
   a) a two-dimensional array having first and second groups of pixels, arranged in rows and columns, wherein pixels from the first group of pixels have narrower spectral photoresponses than pixels from the second group of pixels and wherein the first group of pixels has pixels that have spectral photoresponses that correspond to a set of at least two colors;
   b) the placement of the first and second groups of pixels defining a pattern that has a minimal repeating unit including at least six pixels, so that at least some rows or columns of the minimal repeating unit are composed only of pixels from the second group,
   c) means for combining pixels of like color from at least three adjacent minimal repeating units, and
   d) wherein the minimal repeating unit of the image sensor is:

| | |
|---|---|
| P | P |
| A | B |
| P | P |
| B | C | wherein P represents pixels of the second group,
A represents pixels of a first color of pixels of the first group,
B represents pixels of a second color of pixels of the first group, and
C represents pixels of a third color of pixels of the first group.

5. The image sensor of claim 4 wherein three adjacent minimal repeating units are arranged as follows:

| P | P | P | P | P | P |
|---|---|---|---|---|---|
| A | B | A | B | A | B |
| P | P | P | P | P | P |
| B | C | B | C | B | C | and the combining means includes combining separately the three A pixels, the three B pixels from the second row, the three B pixels from the fourth row, and the three C pixels.

6. The image sensor of claim 4 wherein five adjacent minimal repeating units are arranged as follows:

| P | P | P | P | P | P | P | P | P | P |
|---|---|---|---|---|---|---|---|---|---|
| A | B | A | B | A | B | A | B | A | B |
| P | P | P | P | P | P | P | P | P | P |
| B | C | B | C | B | C | B | C | B | C | and the combining means includes combining separately the leftmost three A pixels, the leftmost two B pixels from the second row, the leftmost three B pixels from the fourth row, the leftmost two C pixels, the rightmost two A pixels, the rightmost three B pixels from the second row, the rightmost three C pixels, and the rightmost two B pixels from the fourth row.

7. The image sensor of claim 4 wherein each of the at least three minimal repeating units is adjacent to at least two of the remaining minimal repeating units.

8. The image sensor of claim 4 wherein the combining means includes combining pixels of like color from four adjacent minimal repeating units that are arranged linearly.

9. The image sensor of claim 8 wherein the combining means includes combining all similarly positioned pixels from the first group from the middle two minimal repeating units together with some similarly positioned pixels from the first group from the remaining two minimal repeating units.

10. The image sensor of claim 9 wherein the minimal repeating units of the image sensor are arranged linearly in overlapping groups of four such that the leftmost minimal repeating unit of a group of four serves as the rightmost minimal repeating unit of another group of four, and the rightmost minimal repeating unit of a group of four serves as the leftmost minimal repeating unit of yet another group of four.

11. The image sensor of claim 8 wherein the four adjacent minimal repeating units are arranged as follows:

| P | P | P | P | P | P | P | P |
|---|---|---|---|---|---|---|---|
| A | B | A | B | A | B | A | B |
| P | P | P | P | P | P | P | P |
| B | C | B | C | B | C | B | C | and the combining means includes separately combining the leftmost three A pixels, the rightmost three B pixels from the second row, the leftmost three B pixels from the fourth row, and the rightmost three C pixels.

12. The image sensor of claim 4 wherein pixels are combined by binning the charge from the pixels, by averaging the voltages produced by the pixels, or by first converting the pixel values to digital numbers and then combining the digital numbers, or combinations thereof.

13. The image sensor of claim 12 wherein the voltages are averaged by first charging capacitors to the voltages produced by the pixels and then connecting the capacitors together to average the voltages, with the capacitors being of equal sizes to perform a simple average or of differing sizes to perform a weighted average.

14. An image sensor for capturing a color image, comprising:
 a) a two-dimensional array having first and second groups of pixels, arranged in rows and columns, wherein pixels from the first group of pixels have narrower spectral photoresponses than pixels from the second group of pixels and wherein the first group of pixels has pixels that have spectral photoresponses that correspond to a set of at least two colors;
 b) the placement of the first and second groups of pixels defining a pattern that has a minimal repeating unit including at least six pixels, so that at least some rows or columns of the minimal repeating unit are composed only of pixels from the second group,
 c) means for combining similarly positioned pixels from at least two adjacent minimal repeating units, and
 d) wherein the minimal repeating unit of the image sensor is:

| P | P |
|---|---|
| A | B |
| P | P |
| P | P |
| B | C |
| P | P | wherein P represents pixels of the second group,
A represents pixels of a first color of pixels of the first group,
B represents pixels of a second color of pixels of the first group, and
C represents pixels of a third color of pixels of the first group.

15. The image sensor of claim 14 wherein pixels are combined by binning the charge from the pixels, by averaging the voltages produced by the pixels, or by first converting the pixel values to digital numbers and then combining the digital numbers, or combinations thereof.

16. The image sensor of claim 15 wherein the voltages are averaged by first charging capacitors to the voltages produced by the pixels and then connecting the capacitors together to average the voltages, with the capacitors being of equal sizes to perform a simple average or of differing sizes to perform a weighted average.

17. An image sensor for capturing a color image, comprising:
 a) a two-dimensional array having first and second groups of pixels, arranged in rows and columns, wherein pixels from the first group of pixels have narrower spectral photoresponses than pixels from the second group of pixels and wherein the first group of pixels has pixels that have spectral photoresponses that correspond to a set of at least two colors;
 b) the placement of the first and second groups of pixels defining a pattern that has a minimal repeating unit including at least six pixels, so that at least some rows or columns of the minimal repeating unit are composed only of pixels from the second group,
 c) means for combining pixels of like color from at least three adjacent minimal repeating units, and
 d) wherein the minimal repeating unit of the image sensor is:

| | |
|---|---|
| P | P |
| A | B |
| P | P |
| P | P |
| B | C |
| P | P | wherein P represents pixels of the second group,
A represents pixels of a first color of pixels of the first group,
B represents pixels of a second color of pixels of the first group, and
C represents pixels of a third color of pixels of the first group.

18. The image sensor of claim 17 wherein three adjacent minimal repeating units are arranged as follows:

| | | | | | |
|---|---|---|---|---|---|
| P | P | P | P | P | P |
| A | B | A | B | A | B |
| P | P | P | P | P | P |
| P | P | P | P | P | P |
| B | C | B | C | B | C |
| P | P | P | P | P | P | and the combining means includes combining separately the three A pixels, the three B pixels from the second row, the three B pixels from the fifth row, and the three C pixels.

19. The image sensor of claim 17 wherein each of the at least three minimal repeating units is adjacent to at least two of the remaining minimal repeating units.

20. The image sensor of claim 17 wherein the combining means includes combining pixels of like color from four adjacent minimal repeating units that are arranged linearly.

21. The image sensor of claim 20 wherein four adjacent minimal repeating units are arranged as follows:

| | | | | | | | |
|---|---|---|---|---|---|---|---|
| P | P | P | P | P | P | P | P |
| A | B | A | B | A | B | A | B |
| P | P | P | P | P | P | P | P |
| P | P | P | P | P | P | P | P |
| B | C | B | C | B | C | B | C |
| P | P | P | P | P | P | P | P | and the combining means includes separately combining the leftmost three A pixels, the rightmost three B pixels from the second row, the leftmost three B pixels from the fourth row, and the rightmost three C pixels.

22. The image sensor of claim 20 wherein the combining means includes combining all similarly positioned pixels from the first group from the middle two minimal repeating units together with some similarly positioned pixels from the first group from the remaining two minimal repeating units.

23. The image sensor of claim 22 wherein the minimal repeating units of the image sensor are arranged linearly in overlapping groups of four such that the leftmost minimal repeating unit of a group of four serves as the rightmost minimal repeating unit of another group of four, and the rightmost minimal repeating unit of a group of four serves as the leftmost minimal repeating unit of yet another group of four.

24. The image sensor of claim 17 wherein pixels are combined by binning the charge from the pixels, by averaging the voltages produced by the pixels, or by first converting the pixel values to digital numbers and then combining the digital numbers, or combinations thereof.

25. The image sensor of claim 24 wherein the voltages are averaged by first charging capacitors to the voltages produced by the pixels and then connecting the capacitors together to average the voltages, with the capacitors being of equal sizes to perform a simple average or of differing sizes to perform a weighted average.

* * * * *